United States Patent
Xiong et al.

(10) Patent No.: US 12,438,663 B2
(45) Date of Patent: Oct. 7, 2025

(54) METHOD AND DEVICE FOR TRANSMITTING RANDOM ACCESS SIGNAL, AND COMPUTER READABLE MEDIUM

(71) Applicant: Samsung Electronics Co., Ltd., Suwon-si (KR)

(72) Inventors: Qi Xiong, Beijing (CN); Feifei Sun, Beijing (CN); Yi Wang, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/646,097

(22) Filed: Apr. 25, 2024

(65) Prior Publication Data

US 2024/0292464 A1 Aug. 29, 2024

Related U.S. Application Data

(63) Continuation of application No. 17/423,001, filed as application No. PCT/KR2020/012963 on Sep. 24, 2020, now Pat. No. 12,052,762.

(30) Foreign Application Priority Data

Sep. 27, 2019 (CN) .......................... 201910926080.6
Oct. 28, 2019 (CN) .......................... 201911032625.5

(Continued)

(51) Int. Cl.
*H04W 74/0833* (2024.01)
*H04L 5/00* (2006.01)

(52) U.S. Cl.
CPC ....... *H04W 74/0833* (2013.01); *H04L 5/0048* (2013.01)

(58) Field of Classification Search
CPC .......................... H04W 74/0833; H04L 5/0048
(Continued)

(56) References Cited

U.S. PATENT DOCUMENTS

2018/0110074 A1 4/2018 Akkarakaran et al.
2019/0132882 A1 5/2019 Li et al.
(Continued)

FOREIGN PATENT DOCUMENTS

CN 109495222 A 3/2019
WO 2018/064367 A1 4/2018

OTHER PUBLICATIONS

Nokia et al., 'On 2-step RACH Procedure', R1-1908342, 3GPP TSG RAN WG1 #98, Prague, Czech Republic, Aug. 16, 2019.
(Continued)

*Primary Examiner* — Gbemileke J Onamuti
(74) *Attorney, Agent, or Firm* — Jefferson IP Law, LLP

(57) ABSTRACT

A method for random access (RA) performed by a terminal in a communication system, is provided. The method includes receiving, from a base station, a first random access channel (RACH) configuration for 4-step RA, a second RACH configuration for 2-step RA, and physical uplink shared channel (PUSCH) configuration, in case that a type of the RA is the 2-step RA, identifying an RA occasion for the 2-step RA; identifying a valid PUSCH resource based on the PUSCH configuration, wherein the valid PUSCH resource is a PUSCH resource not overlapping with the RA occasion for the 2-step RA, and in case that a random access preamble in the RA occasion for the 2-step RA is not mapped to the valid PUSCH resource, transmitting, to the base station, the random access preamble in the RA occasion for the 2-step RA.

20 Claims, 7 Drawing Sheets

(30) Foreign Application Priority Data

| Nov. 7, 2019 | (CN) | .......................... 201911084041.2 |
| Dec. 20, 2019 | (CN) | .......................... 201911327951.9 |
| Sep. 24, 2020 | (KR) | ....................... 10-2020-0123537 |

(58) Field of Classification Search
USPC ........................................................ 370/329
See application file for complete search history.

(56) References Cited

U.S. PATENT DOCUMENTS

| 2019/0320467 | A1 | 10/2019 | Freda et al. |
| 2020/0275491 | A1 | 8/2020 | Ren et al. |
| 2021/0329704 | A1 | 10/2021 | Yang et al. |
| 2022/0191945 | A1 | 6/2022 | Yamamoto et al. |

OTHER PUBLICATIONS

LG Electronics, 'Discussion on Channel Structure for 2-step Rach', R1-1906717, 3GPP TSG RAN WG1 Meeting #97, Reno, USA, May 4, 2019.

Wi Rapporteur (ZTE), 'RAN1 agreements for Rel-16 2-step Rach', R1-1909914, 3GPP TSG RAN WG1 #98, Prague, Czech Republic, Sep. 23, 2019.

Samsung, 'Channel Structure for Two-Step Rach', R1-1904392, 3GPP TSG RAN WG1 #96bis, Xian, China, Mar. 29, 2019.

Extended European Search Report dated Feb. 28, 2022, issued in European Patent Application No. 20869250.9.

Nokia et al., Considerations on 2-step RACH channel structure, R1-1908341 3rd Generation Partnership Project (3GPP), Mobile Competence Centre, 650, Route Des Lucioles, F-06921 Sophia-Antipolis Cedex, France, Aug. 16, 2019, XP051764950.

Anonymous, 3rd Generation Partnership Project (3GPP), 3GPP Technical Specification Group Radio Access Network, NR, Physical layer procedures for control (Release 15), 3GPP TS 38.213 V15.6.0, Jun. 24, 2019, pp. 1-107, XP051754327.

Extended European Search Report dated Feb. 24, 2023, issued in European Application No. 22205984.2.

European Office Action dated Mar. 5, 2024, issued in European Application No. 20 869 250.9-1215.

Ericsson, Channel Structure for Two-Step RACH, R1-1904842, 3GPP TSG-RAN WG1 Meeting #96bis, Apr. 2019.

Chinese Action dated May 23, 2024, issued in Chinese Application No. 201911327951.9.

European Office Action dated Oct. 14, 2024, issued in European Application No. 20 869 250.9-1215.

Chinese Office Action dated Nov. 23, 2024, issued in Chinese Application No. 201911327951.9.

European Office Action dated Apr. 24, 2025, issued in European Application No. 22 205 984.2.

Chinese Office Action dated May 23, 2025, issued in Chinese Application No. 201911327951.9.

METHOD AND DEVICE FOR TRANSMITTING RANDOM ACCESS SIGNAL, AND COMPUTER READABLE MEDIUM

CROSS-REFERENCE TO RELATED APPLICATION(S)

This application is a continuation application of prior application Ser. No. 17/423,001 filed on Jul. 14, 2021; which is a U.S. National Stage application under 35 U.S.C. § 371 of an International application number PCT/KR2020/012963 filed on Sep. 24, 2020, which is based on and claims priority of a Chinese patent application number 201910926080.6 filed on Sep. 27, 2019, in the Chinese Intellectual Property Office, and of a Chinese patent application number 201911032625.5, filed on Oct. 28, 2019, in the Chinese Intellectual Property Office, and of a Chinese patent application number 201911084041.2 filed on Nov. 7, 2019, in the Chinese Intellectual Property Office, and of a Chinese patent application number 201911327951.9, filed on Dec. 20, 2019, in the Chinese Intellectual Property Office, and of a Korean patent application number 10-2020-0123537, filed on Sep. 24, 2020, in the Koran Intellectual Property Office, the disclosure of each of which is incorporated by reference herein in its entirety.

TECHNICAL FIELD

The present disclosure relates to the field of radio communication system technologies, and specifically to a method for transmitting a random access signal and a device performing the method.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Transmission in a radio communication system may include: transmission from a base station (gNB) to a user equipment (UE) (referred to as downlink transmission, a corresponding time slot being referred to as downlink time slot), and transmission from the UE to the base station (referred to as uplink transmission, a corresponding time slot being referred to as uplink time slot).

In the downlink transmission of the radio communication system, the system periodically transmits a synchronization signal and a broadcast channel to a user through SSBs (synchronization signal/PBCH block). The period is a synchronization signal block periodicity (SSB periodicity), or referred to as an SSB burst periodicity. At the same time, the base station may be configured with a physical random access channel configuration period (PRACH configuration period), and configured with a certain number of random access transmission occasions (also referred to as random access occasions, PRACH transmission occasion, RO) within the PRACH configuration period, and it is satisfied that all the SSBs can be mapped to corresponding ROs within an association period (a certain time length).

In a new radio communication system, before the establishment of radio resource control, for example, during a random access procedure, the performance of the random access directly affects user experience. The random access procedure in a traditional radio communication system (such as LTE and LTE-Advanced) is applied to multiple scenarios such as establishing an initial link, cell handover, re-establishing uplink, and re-establishing RRC connection, and is divided into contention-based random access and contention-free random access based on whether the user monopolizes preamble sequence resources. In the contention-based random access, and in the procedure of attempting to establish an uplink, each user selects a preamble sequence from the same preamble sequence resources, and it is possible that a plurality of users may select the same preamble sequence to send to the base station. Therefore, it is especially important to develop a conflict resolution mechanism in the random access. How to reduce the probability of conflict, and how to quickly resolve a conflict that has already occurred is a key indicator affecting the performance of random access.

The contention-based random access procedure in LTE-A is divided into four steps, as shown in FIG. 1. In step S101, the user randomly selects a preamble sequence from a preamble sequence resource pool and sends it to the base station. The base station performs correlation detection on the received signal to identify the preamble sequence sent by the user; in step S102, the base station sends a RAR (Random Access Response) to the user, where the RAR includes a random access preamble sequence identifier, a timing advance instruction determined based on a delay estimate between the user and the base station, a temporary cell radio network temporary identity (C-RNTI), and a time-frequency resource allocated for the user's next uplink transmission; in step S103, the user sends a third message (Msg3) to the base station based on the information in the RAR. Msg3 includes information such as a user terminal identifier and an RRC link request, where the user terminal identifier is unique to the user in order to resolve the conflict; in step S104, the base station sends a conflict resolution identifier to the user, where the sent identifier includes the user terminal identifier that excels in the conflict resolution. After detecting its own identifier, the user upgrades the temporary C-RNTI to C-RNTI, and transmits an ACK signal to the base station to complete the random access procedure and wait for the grant from the base station. Otherwise, the user may start a new random access procedure later.

For the contention-free random access procedure, a preamble sequence may be allocated to the user since the base station knows the user identifier. Therefore, when sending a preamble sequence, the user does not need to randomly select a sequence, but uses the allocated preamble sequence. After detecting the allocated preamble sequence, the base station sends a corresponding random access response, including information such as timing advance and uplink resource allocation. After receiving the random access response, the user considers that the uplink synchronization is completed and waits for further grant from the base station. Therefore, the contention-free random access procedure only includes two steps: the first step is to send a preamble sequence; and the second step is to send a random access response.

The random access procedure in LTE is applicable to the following scenarios:
1. Initial accessing in RRC_IDLE;
2. Re-establishing RRC connection;
3. Cell handover;
4. Downlink data reaching and requesting a random access procedure in RRC connected state (when uplink is nonsynchronous);
5. Uplink data reaching and requesting a random access procedure in RRC connected state (when the uplink is nonsynchronous or no resource is allocated to the grant request in the PUCCH resource; and
6. Positioning.

In some communication systems (authorized spectrums and/or unauthorized spectrums), in order to achieve faster transmission and reception of signals, it is considered to transmit the random access preamble along with data part (indicated as a first message, i.e., message A), and then search for feedback (indicated as a second message, i.e., message B) from the network device in the downlink channel.

DISCLOSURE OF INVENTION

Technical Problem

Since there are very flexible uplink and downlink configurations and some important downlink signals (such as synchronization signal blocks), the uplink resource (message A transmission for two-step random access) configured by the base station may be in conflict with the uplink and downlink configurations. Therefore, how to resolve these conflicts to allow the UE to determine truly valid random access resources for two-step random access and data transmission resources is a problem to be solved.

Solution to Problem

According to an aspect of the present disclosure, a method for transmitting a random access signal is provided, comprising: receiving, from a base station, random access resource configuration and physical uplink shared channel (PUSCH) resource configuration for a random access of a terminal; determining a valid random access resource based on the received random access resource configuration; determining a valid PUSCH resource based on the received PUSCH resource configuration; and transmitting a random access signal to the base station based on the determined valid random access resource and the determined valid PUSCH resource.

In an embodiment of the present disclosure, the determining a valid PUSCH resource based on the received PUSCH resource configuration comprises: determining the valid PUSCH resource based on the PUSCH resource configuration as well as the random access resource configuration.

In an embodiment of the present disclosure, the method further comprises: performing mapping between the valid random access resource and the valid PUSCH resource, upon the valid PUSCH resource being determined, wherein, the transmitting a random access signal to the base station based on the determined valid random access resource and the determined valid PUSCH resource comprises: transmitting the random access signal to the base station based on the valid random access resource, and the valid PUSCH resource to which the valid random access resource is mapped.

In an embodiment of the present disclosure, the determining a valid random access resource based on the received random access resource configuration comprises: determining a two-step random access resource for two-step random access based on the random access resource configuration; determining, from the determined two-step random access resource, a two-step random access resource of which random access time-frequency resource is valid; and/or a two-step random access resource of which random access preamble is valid; and determining the two-step random access resource, of which random access time-frequency resource and random access preamble are both valid, as the valid random access resource, or, determining a valid two-step random access time-frequency resource and a random access preamble determined from the two-step random access resource of the valid two-step random access time-frequency resource, as the valid random access resource.

In an embodiment of the present disclosure, the determining a two-step random access resource for two-step random access based on the random access resource configuration comprises: determining a number N1 of random access transmission occasions (ROs) for four-step random access to which each synchronization signal block (SSB) is mapped; determining, for each SSB, a number N2 of ROs shared for two-step random access and configured by the base station; and determining the first or the last N2 ROs of the N1 ROs for four-step random access as the ROs for two-step random access.

In an embodiment of the present disclosure, the determining a valid PUSCH resource based on the received PUSCH resource configuration comprises: determining a valid PUSCH time-frequency resource and a DMRS resource determined from the PUSCH resource configuration as the valid PUSCH resource.

In an embodiment of the present disclosure, the random access time-frequency resource is determined to be valid if at least one of following conditions is satisfied: uplink and downlink configuration information configured by the base station indicates that the random access time-frequency resource is in an uplink resource; an interval between the random access time-frequency resource and the last SSB in the time slot of corresponding random access channel (RACH) is greater than or equal to a predetermined time interval; and an interval between the random access time-frequency resource and the last time unit of the downlink resource indicated in the uplink and downlink configuration information received from the base station is greater than or equal to a predetermined time interval.

In an embodiment of the present disclosure, the PUSCH time-frequency resource is determined to be valid if at least one of following conditions is satisfied: uplink and downlink configuration information configured by the base station indicates that the PUSCH time-frequency resource is in an uplink resource; an interval between the PUSCH time-frequency resource and the last SSB in the time slot of the PUSCH time-frequency resource is greater than or equal to a predetermined time interval; an interval between the PUSCH time-frequency resource and the last time unit of the downlink resource indicated in the uplink and downlink configuration information received from the base station is greater than or equal to a predetermined time interval; the PUSCH time-frequency resource does not overlap with the random access time-frequency resource; and the PUSCH time-frequency resource does not overlap with a second PUSCH time-frequency resource, wherein the second PUSCH time-frequency resource is another determined PUSCH time-frequency resource in the time slot of the PUSCH time-frequency resource.

In an embodiment of the present disclosure, if the PUSCH time-frequency resource overlaps with a second PUSCH time-frequency resource and the random access time-frequency resource corresponding to the PUSCH time-frequency resource is positioned before or after the random access time-frequency resource corresponding to the second PUSCH time-frequency resource, the PUSCH time-frequency resource is determined to be valid; or if the PUSCH time-frequency resource partially overlaps with the second PUSCH time-frequency resource and the PUSCH time-frequency resource includes a non-overlapping portion which is positioned before or after the overlapping portion, the PUSCH time-frequency resource is determined to be valid.

In an embodiment of the present disclosure, the random access preamble is determined to be valid, if at least one of following conditions is satisfied: the random access time-frequency resource of the random access preamble is valid; the random access preamble corresponds to a PUSCH resource; and the PUSCH time-frequency resource corresponding to the random access preamble is valid.

In an embodiment of the present disclosure, the performing mapping between the valid random access resource and the valid PUSCH resource comprises: if not all valid random access resources can be mapped to the corresponding valid PUSCH resources, mapping an unmapped valid random access resource to a valid PUSCH resource corresponding to a subsequent valid random access resource; and/or re-determining an unmapped valid random access resource to be invalid.

According to another aspect of the present disclosure, a user equipment is provided, comprising a memory and a processor, the memory storing computer-executable instruction thereon, the processor executing the computer-executable instruction to implement the method according to any one of the above embodiments.

According to another aspect of the present disclosure, a computer readable medium storing computer-executable instruction is provided, the instruction when executed by one or more processors, causes the one or more processors to implement the method according to any one of the above embodiments.

According to an aspect of the present disclosure, a method for 2-step random access (RA) performed by a terminal (UE) is provided, comprising: receiving, from a base station, first random access channel (RACH) configuration for 4-step RA, second RACH configuration for the 2-step RA, and physical uplink shared channel (PUSCH) configuration, the first RACH configuration including information on RA occasions for the 4-step RA; in case that an index indicating a subset of the RA occasions is included in the second RACH configuration, identifying at least one RA occasion for the 2-step RA based on the subset; identifying at least one PUSCH resource based on the PUSCH configuration and the at least one RA occasion; and transmitting, to the base station, a random access preamble in the at least one RA occasion and a PUSCH in the at least one PUSCH resource.

According to an aspect of the present disclosure, a method for 2-step random access (RA) performed by a base station is provided, comprising: transmitting, to a terminal, first random access channel (RACH) configuration for 4-step RA, second RACH configuration for the 2-step RA, and physical uplink shared channel (PUSCH) configuration, the first RACH configuration including information on RA occasions for the 4-step RA; and receiving, from the terminal, a random access preamble in at least one RA occasion for the 2-step RA and a PUSCH in at least one PUSCH resource, wherein in case that an index indicating a subset of the RA occasions is included in the second RACH configuration, the at least one RA occasion is identified based on the subset, and wherein the at least one PUSCH resource is identified based on the PUSCH configuration and the at least one RA occasion.

According to an aspect of the present disclosure, a terminal (UE) is provided, The terminal comprises a transceiver and a processor coupled with the transceiver. The processor is configured to: receive, from a base station, first random access channel (RACH) configuration for 4-step RA, second RACH configuration for 2-step RA, and physical uplink shared channel (PUSCH) configuration, the first RACH configuration including information on RA occasions for the 4-step RA, in case that an index indicating a subset of the RA occasions is included in the second RACH configuration, identify at least one RA occasion for the 2-step RA based on the subset, identify at least one PUSCH resource based on the PUSCH configuration and the at least one RA occasion, and transmit, to the base station, a random access preamble in the at least one RA occasion and a PUSCH in the at least one PUSCH resource.

According to an aspect of the present disclosure, a base station is provided, The base station comprises a transceiver and a processor coupled with the transceiver. The processor is configured to: transmit, to a terminal, first random access channel (RACH) configuration for 4-step RA, second RACH configuration for 2-step RA, and physical uplink shared channel (PUSCH) configuration, the first RACH configuration including information on RA occasions for the 4-step RA, and receive, from the terminal, a random access preamble in at least one RA occasion for the 2-step RA and a PUSCH in at least one PUSCH resource, wherein in case that an index indicating a subset of the RA occasions is included in the second RACH configuration, the at least one RA occasion is identified based on the subset, and wherein the at least one PUSCH resource is identified based on the PUSCH configuration and the at least one RA occasion.

Advantageous Effects of Invention

According to methods and apparatus for transmitting a random access signal provided by the present disclosure, when a random access resource and a data resource are used, the validity of the random access resource and the data resource is first estimated based on random access resource configuration and data resource configuration, which can avoid conflicts between uplink resources (for transmitting messages for two-step random access) configured by the base station and other configured uplink-downlink resources, thereby achieving valid transmission of random access resources and data resources for two-step random access.

BRIEF DESCRIPTION OF DRAWINGS

The above and other objectives, features, and advantages of the present disclosure will become clearer through the following description of embodiments of the present disclosure with reference to the accompanying drawings, in the accompanying drawings.

MODE FOR THE INVENTION

Figure 1:
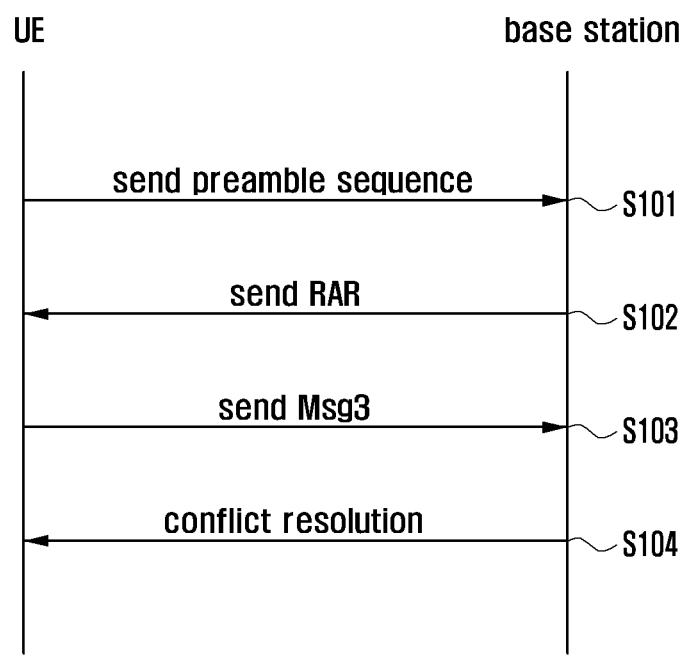
FIG. 1 shows a contention-based random access procedure.

Hereinafter, the embodiments of the present disclosure will be described with reference to the accompanying drawings. It should be understood, however, that these descriptions are merely exemplary and are not intended to limit the scope of the present disclosure. In addition, in the following description, descriptions and techniques of well-known structures are omitted to avoid unnecessarily obscuring the concepts of the present disclosure.

Those skilled in the art may understand that, as used herein, the singular forms "a", "an" and "the" are intended to include the plural forms as well, unless clearly indicates otherwise. It should be further understood that the terms "includes," and "including," when used in this specification of the present disclosure, specify the presence of the stated features, integers, steps, operations, elements, and/or components, but do not preclude the presence or addition of one or more other features, integers, steps, operations, elements, components, and/or groups thereof. It should be understood that when an element is referred to as being "connected to" or "coupled to" another element, it may be directly connected to, or coupled to the other element, or an intervening element may be present. Furthermore, "connected to" or "coupled to" as used herein may include wireless connection or wireless coupling. As used herein, the term "and/or" includes all or any of one or more associated listed items and all combinations thereof.

Those skilled in the art may understand that, unless otherwise defined, all terms (including technical and scientific terms) used herein have the same meaning as commonly understood by one of ordinary skill in the art to which the present disclosure belongs. It should be further understood that terms, such as those defined in commonly used dictionaries, should be interpreted as having a meaning that is consistent with their meaning in the context of the relevant art, and should not be interpreted in an idealized or overly formal sense, unless expressly so defined herein.

Those skilled in the art may understand that "terminal" and "terminal equipment" as used herein include both radio signal receiver without transmission capabilities, and equipment with receiving and transmission hardware capable of bidirectional communication on a bidirectional communication link. Such equipment may include: cellular or other communication equipment, which has a single-line display or multi-line display or a cellular or other communication equipment without a multi-line display; PCS (Personal Communications Service), which may combine voice and data processing, fax and/or data communication capabilities; PDA (Personal Digital Assistant), which may include RF receivers, pagers, Internet/Intranet access, web browsers, notepads, calendars, and/or GPS (Global Positioning System) receivers; and conventional laptop and/or palmtop computers or other devices, which are conventional laptops and/or palmtop computers or other devices having and/or including radio frequency receivers. The "terminal" and "terminal equipment" as used herein may be portable, transportable, installed in a vehicle (air, sea, and/or land), or suitable for and/or configured to operate locally, and/or in a distributed form, operating on any other location on earth and/or space. The "terminal" and "terminal equipment" as used herein may also be communication terminals, Internet terminals, music/video playback terminals, may be, for example, PDAs, MIDs (Mobile Internet Device), and/or mobile phones with music/video playback function, and may also be smart TVs, set-top boxes and other devices.

A time domain unit (also referred to as a time unit) in the present disclosure may be: an OFDM symbol, an OFDM symbol group (composed of multiple OFDM symbols), a time slot, a time slot group (composed of multiple time slots), a subframe, a subframe group (composed of multiple subframes), a system frame, a system frame group (composed of multiple system frames); it may also be an absolute time unit, such as 1 millisecond, or 1 second; and a time unit may also be a combination of multiple granularities, such as N1 time slots plus N2 OFDM symbols.

A frequency domain unit in the present disclosure may be: a subcarrier, a subcarrier group (composed of multiple subcarriers), a resource block (RB), which may also be referred to as a physical resource block (PRB), a resource block group (composed of multiple RBs), a bandwidth part (BWP), a bandwidth part group (composed of multiple BWPs), a frequency band/carrier, and a frequency band group/carrier group; it may also be an absolute frequency domain unit, such as 1 Hz, or 1 kHz; and a frequency domain unit may also be a combination of multiple granularities, such as M1 PRBs plus M2 subcarriers.

In order to make the objectives, technical means, and advantages of the present disclosure clearer, the present disclosure is further described in detail below with reference to the accompanying drawings and the specific embodiments.

Figure 2:
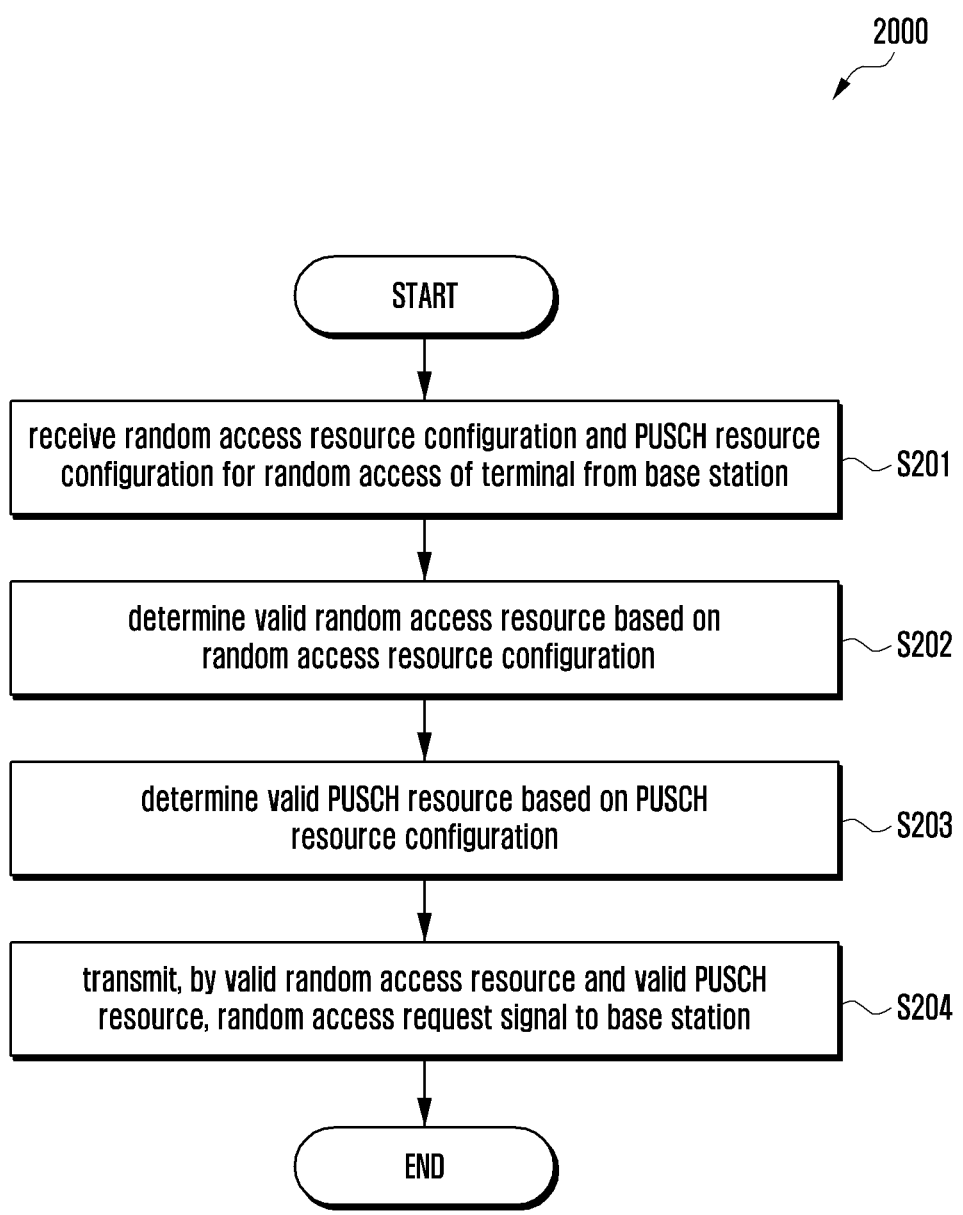
FIG. 2 shows a flowchart of a random access method for a terminal according to an embodiment of the present disclosure.

FIG. 2 shows a flowchart of a random access method 200 according to an embodiment of the present disclosure. According to an embodiment of the present disclosure, the random access method 2000 is a two-step random access method.

As shown in FIG. 2, the method 2000 includes receiving random access resource configuration and PUSCH resource configuration for random access of terminal from a base station (S201); determining a valid random access resource based on the random access resource configuration (S202); determining a valid PUSCH resource based on the PUSCH resource configuration (S203); and transmitting, by the valid random access resource and the valid PUSCH resource, a random access request signal to the base station (S204). The above steps will be further described below.

In step 201, a UE receives resource configuration information for random access from the base station, and the resource configuration information includes random access resource configuration information and data resource configuration information (i.e., PUSCH resource configuration information). The configuration information may indicate a random access resource and a PUSCH resource used for random access by the UE. The random access resource may include a random access time-frequency resource and a preamble. The PUSCH resource may include a PUSCH time-frequency resource and a DMRS resource.

According to an embodiment of the present disclosure, the UE obtains resource configuration information for an uplink signal from network-side configured and/or pre-configured information to obtain two-step random access resource configuration, and performs two-step random access transmission.

According to an embodiment of the present disclosure, the resource configuration information may include four-step random access configuration information. According to an embodiment of the present disclosure, the four-step random access configuration information includes at least one of the following: a four-step random access configuration period (P_4STEPRACH), a four-step random access occasion time unit index (for example, a time slot index, a symbol index, a subframe index, etc.), a four-step random access occasion frequency unit index (for example, a carrier index, a BWP index, a PRB index, a subcarrier index, etc.), the number of four-step random access occasions, a four-step random access preamble format (for example, the length of a cyclic prefix CP, the length and the number of repetitions of a preamble sequence, the length of a guard interval GT, the interval size of a subcarrier used, etc.), the number of four-step random access preambles, the index of a root sequence, a cyclic shift value, the number of SSBs that may be mapped to a four-step random access occasion (4STEPRO), one or more CSI-RS indexes for four-step random access, the number of 4STEPROs which a CSI-RS is mapped to and one or more 4STEPRO indexes which a CSI-RS is mapped to, a four-step random access configuration index (indicating from a configuration table one of the configurations for four-step random access, the one configuration including one or more types of the above-mentioned configuration information).

According to an embodiment of the present disclosure, the resource configuration information may further include random access resource configuration information for two-step random access. According to an example embodiment, the random access resource configuration information for two-step random access includes at least one of the following: a two-step random access configuration period (P_2STEPRACH), a two-step random access occasion time unit index (for example, a time slot index, a symbol index, a subframe index, etc.), a two-step random access occasion frequency unit index (for example, a carrier index, a BWP index, a PRB index, a subcarrier index, etc.), the number of two-step random access occasions, a two-step random access preamble format (for example, the length of a cyclic prefix CP, the length and the number of repetitions of a preamble sequence, the length of a guard interval GT, the interval size of a subcarrier used, etc.), the number of two-step random access preambles, the index of a root sequence, a cyclic shift value, the number of SSBs that may be mapped to a two-step random access occasion (2STEPRO), one or more CSI-RS indexes for two-step random access, the number of 2STEPROs a CSI-RS is mapped to, one or more 2STEPRO indexes a CSI-RS is mapped to, a two-step random access configuration index (indicating from a configuration table one of the configurations for two-step random access, the one configuration including one or more types of the above-mentioned configuration information), preferably, when the two-step random access configuration index is not configured, the UE determines that the base station does not configure the separate two-step random access resource at this time, and part of the random access resource indicated by the four-step random access configuration index may be shared for the two step random access (such as sharing random access time-frequency resources); specifically, two-step random access uses the same preamble format as four-step random access, and a two-step random access configuration index only indicates one of W configurations corresponding to the preamble format configured for four-step random access. For example, there are 256 configurations in the configuration table, and each configuration may indicate a preamble format, however, for example, the number of configurations corresponding to a preamble format A1 is W=30, and the base station selects from the 256 configurations a configuration carrying A1 preamble format and use it as the four-step random access configuration; then one of the W=30 configurations carrying the A1 preamble format indicated by the two-step random access configuration index, for example, the two-step random access configuration index is 13, means that the 13th configuration out of the W=30 configurations carrying the A1 preamble format (may also be equivalent to reordering the logical sequence number 13 according to the 30 configurations corresponding to A1) is the two-step random access configuration. This may reduce the indication overhead of the two-step random access configuration index, for example, a complete table indication needs 8 bits, but only 5 bits is needed for indication using this method.

According to an embodiment of the present disclosure, specifically, if parameters in the two-step random access configuration information are not configured separately, the UE may determine the parameters according to the relative relationship of the corresponding parameters in the four-step random access configuration information, for example, the two-step random access configuration period is obtained by calculating the four-step random access configuration period and a pre-defined or pre-configured spreading parameter.

According to an embodiment of the present disclosure, the resource configuration information may include downlink beam (for example, SSB and/or CSI-RS) configuration information. According to an embodiment of the present disclosure, the downlink beam configuration information may include at least one of the following: the size of a downlink beam period, the number of downlink beams transmitted in one downlink beam period, the indexes of the downlink beams transmitted in one downlink beam period, the time unit locations of the downlink beams transmitted in one downlink beam period and the frequency unit locations of the downlink beams transmitted in one downlink beam period.

According to an embodiment of the present disclosure, the resource configuration information may include data resource configuration information for two-step random access, that is, physical uplink shared channel PUSCH resource configuration information. A PUSCH resource unit comprises a PUSCH time-frequency resource unit and a DMRS resource unit. According to an embodiment of the present disclosure, the PUSCH resource configuration information includes PUSCH time-frequency resource configuration information and/or DMRS configuration information.

According to an embodiment of the present disclosure, the PUSCH time-frequency resource configuration information may include the sizes of one or more PUSCH time-frequency resource unit, that is, the size of a PUSCH time-frequency resource corresponding to a two-step random access preamble. For example, a PUSCH time-frequency resource unit may include M time units and N frequency domain units. According to an embodiment of the present disclosure, if there are multiple PUSCH time-frequency resource units, the sizes of different PUSCH time-frequency resource units may be different, that is, the value of M and/or N may be different depending on the different PUSCH time-frequency resource units. The size of the PUSCH time-frequency resource unit may be obtained by looking up a table.

According to an embodiment of the present disclosure, the PUSCH time-frequency resource configuration information may include a PUSCH time-frequency resource configuration period (P_PUSCH), the time unit index of a PUSCH time-frequency resource unit (for example, a time slot index, a symbol index, a subframe index, etc.) and/or the frequency unit index of a PUSCH time-frequency resource unit (such as a carrier index, a BWP index, a PRB index, and a subcarrier index.)

According to an embodiment of the present disclosure, the PUSCH time-frequency resource configuration information may include the time domain starting position of a PUSCH time-frequency resource. The time domain starting position of a PUSCH time-frequency resource may be determined by a time interval (e.g., T time units) between the PUSCH time-frequency resource configured by a network equipment and the time range of the corresponding two-step random access time-frequency resource, and the time length (for example, M1 time units or M1 PUSCH time-frequency resource units for two-step random access) occupied by the PUSCH time-frequency resource configured by the network equipment.

According to an embodiment of the present disclosure, the time range of the two-step random access time-frequency resource may be at least one of the following: a directly selected two-step random access time-frequency resource (i.e., the selected RO); the random access time slot of the selected two-step random access time-frequency resource or the last RO therein in the time domain; the random access configuration period of the selected two-step random access time-frequency resource or the last RO therein in the time domain; a mapping circle of downlink beam in the selected two-step random access time-frequency resource to the random access resource or the last RO therein in the time domain; an association period of downlink beam in the selected two-step random access time-frequency resource to the random access resource or the last RO therein in the time domain; an association pattern period of downlink beam in the selected two-step random access time-frequency resource to the random access resource or the last RO therein in the time domain.

According to an embodiment of the present disclosure, the PUSCH time-frequency resource unit for the two-step random access may be defined as the time-frequency resource size of transmitting a specific sized data portion. The PUSCH time-frequency resource unit includes pre-defined X time units and Y frequency units. According to an embodiment of the present disclosure, there may be a guard interval (delta time units) between two adjacent two-step random access PUSCH time-frequency resources in the same time slot, and the guard interval may be within the PUSCH time-frequency resource unit (that is, delta is included in X), or not included in the PUSCH time-frequency resource unit (that is, delta is not included in X).

According to an embodiment of the present disclosure, the configured M1 PUSCH time-frequency resource units for two-step random access is for the time range of the corresponding two-step random access time-frequency resource. For example, from a given RACH time slot, M1 PUSCH time-frequency resource units for two-step random access configured by the base station can be found, and from another RACH time slot, M1 PUSCH time-frequency resource units for the corresponding two-step random access configured by the base station can also be found.

Figure 3:
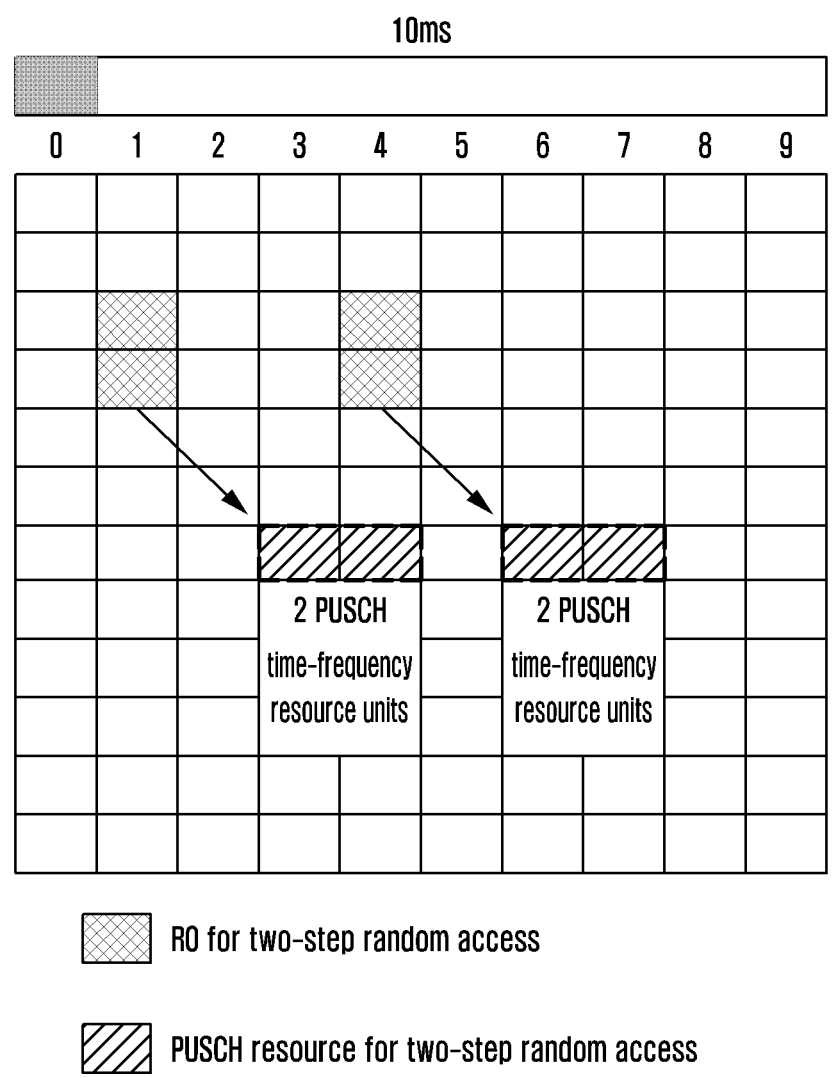
FIG. 3 is a view of a random access time-frequency resource corresponding to a PUSCH time-frequency resource according to an embodiment of the present disclosure.

Referring to FIG. 3, according to an embodiment of the present disclosure, if the base station is configured with two RACH time slots (for example, time slot 1 and time slot 4), and for both time slot 1 and time slot 4, M1=2 PUSCH time-frequency resource units are configured, that is, two PUSCH time-frequency resource units can be found for the time slot 1, and two PUSCH time-frequency resource units can also be found for the time slot 4. According to an embodiment of the present disclosure, the positions of the PUSCH time-frequency resources on time slot 3 and time slot 4 configured by the base station can be determined by the position of the random access time-frequency resource on time slot 1 and a time interval (offset) between the random access time-frequency resources on the time slot 1 and the time slot 3 and the random access time-frequency resource on the time slot 1 obtained from the configuration information. The positions of the PUSCH time-frequency resources on a time slot 6 and a time slot 7 configured by the base station can be determined by the position of the random access time-frequency resource on the time slot 4 and a time interval (offset) between the random access time-frequency resources on the time slot 6 and 7 and the random access time-frequency resource on the time slot 4 obtained from the configuration information. In other words, the PUSCH time-frequency resources on the time slot 3 and the time slot 4 configured by the base station correspond to the random access time-frequency resource on the time slot 1. The PUSCH time-frequency resources on the time slot 6 and the time slot 7 configured by the base station correspond to the random access time-frequency resource on the time slot 4. Alternatively, the PUSCH resource on the PUSCH time-frequency resources on the time slot 3 and the time slot 4 configured by the base station corresponds to the random access resource on the random access time-frequency resource on the time slot 1. The PUSCH resource on the PUSCH time-frequency resources on the time slot 6 and the time slot 7 configured by the base station corresponds to the random access resource on the random access time-frequency resource on the time slot 4. Each random access time-frequency resource corresponds to a given number of PUSCH time-frequency resources, or each random access resource corresponds to a given number of PUSCH resources.

According to an embodiment of the present disclosure, the PUSCH time-frequency resource configuration information may include the frequency starting position and the number of frequency units of the PUSCH time-frequency resource or PUSCH resource units (for example, M2 PUSCH resource units) for two-step random access.

The frequency starting position may be predefined or pre-configured, for example, the frequency starting of the PUSCH time-frequency resource for two-step random access is located after N frequency-domain units from a frequency-domain position. The above-mentioned frequency position may be: a frequency band portion, a carrier, etc.; and/or a frequency starting position of the selected two-step random access RO.

According to an embodiment of the present disclosure, at the same time, a protection carrier (delta frequency domain units) may be provided between two adjacent PUSCH resources for two-step random access in the frequency domain, and the protection carrier may be in a PUSCH resource unit (that is, delta is included in Y), or not included in a PUSCH resource unit (that is, delta is not included in Y).

According to an embodiment of the present disclosure, the time starting position of the indicated PUSCH time-frequency resource is the position of the first PUSCH time-frequency resource unit, and/or the frequency starting position of the indicated PUSCH time-frequency resource is the position of the first PUSCH time-frequency resource unit. Other time-frequency resources corresponding to all two-step random access time-frequency resources within the time range of the two-step random access time-frequency resources selected by the UE are obtained by sequential derivation in the frequency domain first then time domain or time domain first then frequency domain method.

According to an embodiment of the present disclosure, the PUSCH time-frequency resource configuration information may include the number of PUSCH time-frequency resource units (or the number of PUSCH time-frequency resource units in the time domain and/or the number of PUSCH time-frequency resource units in the frequency domain configured separately), the PUSCH time-frequency resource unit format (such as the number of repetitions, the length of a guard interval GT, or the guard interval GP in frequency domain), the number of downlink beams that may be mapped on a PUSCH time-frequency resource unit, one or more downlink beam indexes for two-step random access PUSCH transmission, the number of PUSCH time-frequency resource units which a downlink beam is mapped on and/or one or more PUSCH time-frequency resource unit indexes which a downlink beam is mapped on.

According to an embodiment of the present disclosure, the DMRS configuration information may include at least one of the following: the number N_DMRS and/or indexes of available DMRS ports (that is, each DMRS port corresponds to its own port configuration information) and/or DMRS sequence index (for example, may be a scrambled ID, etc.) and DMRS port configuration information on a PUSCH time-frequency resource unit.

According to an embodiment of the present disclosure, the DMRS port configuration information may include at least one of the following: a sequence type, such as indicating whether it is a ZC sequence, or a gold sequence; a cyclic shift interval; a sequence length (that is, a subcarrier occupied by a DMRS sequence); a time domain orthogonal cover code (TD-OCC), for example, a TD-OCC with length 2 may be: [+1 −1], [−1,+1]; a frequency domain orthogonal cover code (FD-OCC), for example, a FD-OCC with length 2 may be: [+1-1], [−1,+1]; comb configuration, including comb size and/or comb offset, for example, the comb size is 4, indicating the 0th RE of every 4 REs in the DMRS sequence if the offset is 0, and indicating the 1st RE of every 4 REs in the DMRS sequence if the offset is 1.

According to an embodiment of the present disclosure, for the data resource configuration information for the two-step random access, the network side may have two possible configuration types:
1. Type 1: UE obtains configured two-step random access data resource through separate two-step random access data resource configuration information on the network side, and then by defined mapping parameters and/or rules of the random access resource and the data resource, the UE may obtain a mapping relationship between the random access resource and the data resource;
2. Type 2: the network side obtains configured data resource for two-step random access and obtains a mapping relationship between the random access resource and the data resource, through the configured random access resource for two-step random access, then by configuring a relative time-frequency relationship between the data resource for two-step random access and the random access resource for the two-step random access (for example, time domain and/or frequency domain interval), and/or through defined mapping parameters and/or rules of the random access resource and the data resource.

According to an embodiment of the present disclosure, the UE may obtain all or part of the above resource configuration information from at least one of the following:
1. in the random access response (RAR) of the random access procedure, such as the uplink grant (UL grant) information therein;
2. in downlink control information for granting uplink transmission, for example, in uplink grant (UL grant) information or in a separate DCI configuration therein; where the granted uplink transmission may be a new transmission of data or a retransmission of data;
3. in high-level control signaling such as a system message sent by the network side or an RRC configuration message obtained by the UE; and
4. in pre-configured parameter information.

Specifically, the UE may obtain all or part of the resource configuration information by at least one of the above methods, for example, the PUSCH time-frequency resource configuration information is obtained through a system message, and the DMRS configuration information is obtained through an RRC configuration information of the UE.

Specifically, when the configured two-step random access and four-step random access share the random access time-frequency resource, the two-step random access may share parts of the random access time-frequency resources of the four-step random access. According to an embodiment of the present disclosure, using the number N_shared of shared ROs configured by the base station, the UE determines the first (or last) N_shared ROs for the two-step random access in the order from frequency domain to time domain (or time domain to frequency domain), and the partially shared ROs are used for the two-step random access. According to another example of the present disclosure, using the number N_sharedperSSB of shared ROs in each SSB configured by the base station, the UE firstly obtains the number of four-step random access ROs mapped in each SSB, and then determines the first (or last) N_sharedperSSB ROs therein for the two-step random access. Specifically, the number N_sharedperSSB of ROs shared to the two-step random access in each SSB configured by the base station may be derived from the number N_SSBper2stepRO of SSBs (may be equivalent to the number of two-step random access ROs mapped to one SSB) that may be mapped to each two-step random access RO configured by the base station. That is, the number N_SSBper2stepRO of SSBs that may be mapped on each two-step random access RO configured by the base station, when the four-step random access and the two-step random access are configured separately, it may be understood that N_SSBper2stepRO SSBs may be mapped to a two-step random access RO, and when the four-step random access and the two-step random access shares the configured ROs, it may be understood that the first (or last) 1/N_SSBper2stepRO ROs of the four-step random access ROs to which an SSB is mapped is shared for the two-step random access. Preferably, N_sharedperSSB may be a sharedROmaskindex, which is used to indicate a random access occasion (PRACH occasion, RO) index for two-step random access corresponding to each SSB in four-step random access, as shown in Table 1 below. For example, sharedROmaskindex indicates RO index 3, which means that the third RO in a given SSB index is used for two-step random access (within an SSB-RO mapping ring).

TABLE 1

| Shared RO mask index value | |
|---|---|
| sharedROmaskindex value | RO index shared in a single SSB |
| 0 | All |
| 1 | RO index 1 (PRACH occasion index 1) |
| 2 | RO index 2 |
| 3 | RO index 3 |
| 4 | RO index 4 |
| 5 | RO index 5 |
| 6 | RO index 6 |
| 7 | RO index 7 |
| 8 | RO index 8 |
| 9 | Every even RO index |
| 10 | Every odd RO index |
| 11 | Reserved |
| 12 | Reserved |
| 13 | Reserved |

TABLE 1-continued

| Shared RO mask index value | |
|---|---|
| sharedROmaskindex value | RO index shared in a single SSB |
| 14 | Reserved |
| 15 | Reserved |

Preferably, sharedROmaskindex may indicate that the random access occasion before or after the random access occasion (PRACH occasion, RO) index corresponding to each SSB in four-step random access is used for two-step random access. For example, if an SSB is mapped to 4 ROs, (RO 1~4), sharedROmaskindex indicates RO index 3, which means that all ROs before the third RO corresponding to a given SSB index is used for two-step random access within an SSB-RO mapping ring, that is, RO1, RO2, and RO3 are used for two-step random access, or all ROs after the third RO are used for two-step random access, that is, RO3 and RO4 are used for two-step random access. Specifically, the indicated RO index may not be included, that is, the previous RO1 and RO2 (excluding RO3) or subsequent RO4 (excluding RO3) in the above example are ROs used for two-step random access.

Preferably, the design of the sharedROmaskindex value is optimized based on the number of ROs (i.e., 1, 2, 4, 8) that an SSB may correspond to. In addition to the above method, at least one of the following methods may be used in combination or alone:

1. sharedROmaskindex has only 2 bits, which informs four possible conditions, as shown in Table 2. In this way, when the number of ROs that an SSB may correspond to is 1, 2, 4, or 8, even or odd numbers of the resource may indicate half of the resource and the resources are distributed as evenly as possible, and index 1 is used to indicate that the first (or last) RO is shared to two-step random access; preferably, when sharedROmaskindex is not configured, the UE determines that the base station does not share four-step random access resource for two-step random access at this time, but uses independently configured two-step random access resource;

TABLE 2

| Shared RO mask index value | |
|---|---|
| sharedROmaskindex value | RO index shared under a single SSB |
| 0 | All |
| 1 | RO index 1 (first RO) |
| 2 | Every even RO index (Every even PRACH occasion) |
| 3 | Every odd RO index (Every odd PRACH occasion) |

2. sharedROmaskindex has only 2 bits, and 5 conditions may be informed. When sharedROmaskindex is not indicated, it means that all ROs corresponding to an SSB are shared to two-step random access; and the other four conditions are shown in Table 3, with an additional condition being that for an SSB corresponding to 8 ROs, two ROs that are evenly distributed such as 1, 5 may be configured and shared to two-step random access;

TABLE 3

Shared RO mask index value

| sharedROmaskindex value | RO index shared under a single SSB |
| --- | --- |
| 0 | RO index 1 (first RO) |
| 1 | Every even RO index (Every even PRACH occasion) |
| 2 | Every odd RO index (Every odd PRACH occasion) |
| 3 | Every four ROs starting from the first RO |

3. sharedROmaskindex is a 4 bits value. The reserved values in the previous table may be rewritten to adapt to more scenarios. Since the original value only indicates odd ORs, even ORs, single RO, and all ROs, the information that may be configured is limited. The specific design is shown in Table 4, where index 11 indicates that the first 3 or the last 3 ROs are used for two-step random access among the ROs corresponding to a configured SSB, and the subsequent indexes may be expanded according to this logic; or, as shown in index 12, the first RO and then an RO every 4 ROs is selected to be shared for two-step random access. In this way, The number of methods for configuring shared ROs can be increased, and the shared ROs can be decentralizes as much as possible, so that the UE may choose random access resources at different times, which is beneficial to reducing the access delay of the UE.

TABLE 4

Shared RO mask index value

| sharedROmaskindex value | RO index shared under a single SSB |
| --- | --- |
| 0 | All |
| 1 | RO index 1 |
| 2 | RO index 2 |
| 3 | RO index 3 |
| 4 | RO index 4 |
| 5 | RO index 5 |
| 6 | RO index 6 |
| 7 | RO index 7 |
| 8 | RO index 8 |
| 9 | Every even RO index (Even even PRACH occasion) |
| 10 | Every odd RO index (Every odd PRACH occasion) |
| 11 | First (or last) 3 ROs |
| 12 | first RO and an RO every 4 ROs starting from the first RO (for example, when an SSB corresponds to 8 ROs, the index value indicates the first RO and the fifth RO) |
| 13 | Second RO and RO every four ROs starting from the second RO (for example, when an SSB corresponds to 8 ROs, the index value indicates the second RO and the sixth RO) |
| 14 | Third RO and RO every four ROs starting from the third RO (for example, when an SSB corresponds to 8 ROs, the index value indicates the third RO and the seventh RO) |
| 15 | Fourth RO and RO every four ROs starting from the fourth RO (for example, when an SSB corresponds to 8 ROs, the index value indicates the fourth RO and the eighth RO) |

Figure 4:
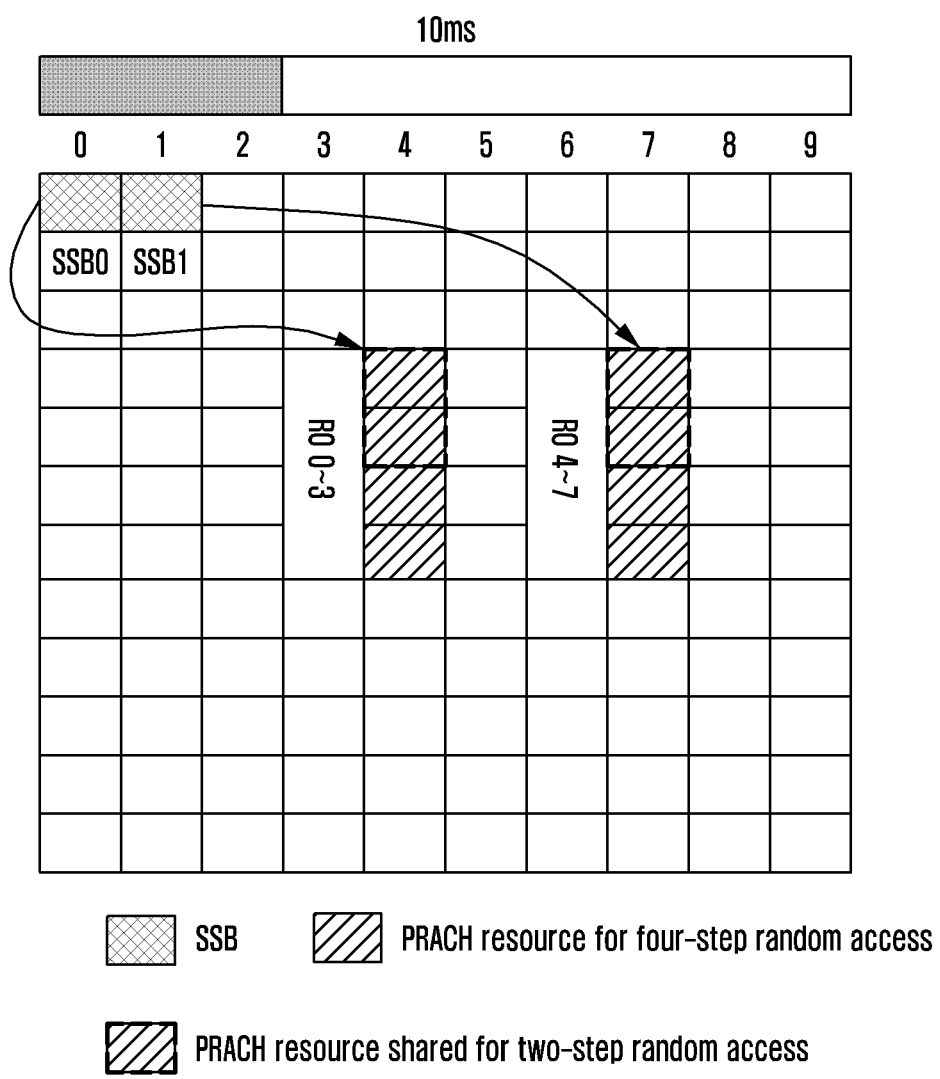
FIG. 4 is a view of two-step and four-step sharing random access time-frequency resources according to an embodiment of the present disclosure.

As shown in FIG. 4, the base station configures 2 SSBs, SSB0 and SSB1, in an SSB period (10 ms), and at the same time configures 8 ROs (on time slot 4 and time slot 7 respectively) in a four-step random access configuration period (10 ms), and each SSB is mapped to 4 ROs.

According to an embodiment of the present disclosure, the two-step random access the four-step random access configured by the base station may share ROs, and the UE may determine the first N_shared=4 ROs for two-step random access in the order of frequency domain first and time domain second, that is, the random access time-frequency resource RO 0~4 may be shared for two-step random access.

According to an embodiment of the present disclosure, the two-step random access the four-step random access configured by the base station share ROs, and the UE may determine that the first N_sharedperSSB=2 ROs which each SSB is mapped to are shared for two-step random access, then the UE may determine that random access time-frequency resources RO 0~1 and RO 4~5 are shared for two-step random access, thereby ensuring that the same number of RO resources are available in each SSB.

Based on the above configuration information, the UE may obtain mapping information of a downlink beam (taking SSB as an example) to RO (including four-step random access RO and/or two-step random access RO). The mapping information includes an SSB-to-RO association period (such as the number of random access configuration periods required to complete at least one SSB-to-RO mapping) and/or an SSB-to-RO association pattern period (for example, the time length ensuring that the mapping of SSB to RO in two adjacent association pattern periods is exactly the same, such as the number of SSB-to-RO association periods required, or the number of random access configuration periods required).

Similarly, the UE may obtain CSI-RS to RO mapping information based on the above configuration information. The mapping information includes a CSI-RS to RO association period (such as the number of random access configuration periods required to complete the mapping of all CSI-RS to RO in at least one CSI-RS period) and/or a CSI-RS to RO association pattern period (for example, the time length ensuring that the mapping of CSI-RS to RO in two adjacent association pattern periods is exactly the same, the number of CSI-RS to RO association periods required, or the number of random access configuration periods required).

For determining the resource configuration of two-step random access, the UE also needs to determine the mapping relationship between the random access resource of two-step random access and the data resource of two-step random access. The mapping relationship includes an association period of the random access resource of two-step random access and the data resource of two-step random access and/or a mapping rule of the random access resource of two-step random access and the data resource of two-step random access (such as mapping parameters of the random access resource to the data resource).

According to the above received configuration information, the UE may obtain the four-step random access configuration information and the two-step random access configuration information at the same time, and the UE may perform four-step random access or two-step random access depending on configuration by the base station, or depending on a RSRP threshold value configured by the base station. If the RSRP measured by the UE is higher than the threshold, two-step random access is selected; otherwise, four-step random access is performed.

Referring back to FIG. 2, in step S202, the UE determines a valid random access resource based on the random access resource configuration.

According to an embodiment of the present disclosure, the UE determines random access resource based on the random access resource configuration, and determines the valid random access resource from the random access resource. According to an embodiment of the present disclosure, the UE determines whether random access resource configured in the random access resource configuration is valid. According to an embodiment of the present disclosure, the UE determines whether a random access time-frequency resource in the random access resource is valid, and determines whether a preamble in the random access resource is valid. If both the random access time-frequency resource and the preamble included in the random access resource are valid, then the UE considers that the random access resource is valid. According to an embodiment of the present disclosure, if the random access time-frequency resource included in the random access resource is valid, then the UE considers that the random access resource in which the valid random access time-frequency resource is located is valid, irrelevant with whether the preamble in the random access resource is valid.

According to an embodiment of the present disclosure, the UE determines the valid random access time-frequency resource and the valid random access preamble determined from the random access time-frequency resource as the valid random access resource. According to an embodiment of the present disclosure, the UE determines the valid random access time-frequency resource and the random access preamble determined from the random access time-frequency resource as the valid random access resource.

According to an embodiment of the present disclosure, the UE determines a two-step random access resource for two-step random access based on the random access resource configuration. The random access resource configuration received from the base station may include a four-step random access resource for four-step random access and a two-step random access resource for two-step random access. According to an embodiment of the present disclosure, the UE directly determines the two-step random access resource based on indication of the random access resource configuration. According to an embodiment of the present disclosure, when the configured two-step random access and four-step random access share the random access time-frequency resource, the two-step random access may share part of the random access time-frequency resource of the four-step random access. According to an embodiment of the present disclosure, the UE may determine the number N1 of four-step random access ROs which each SSB is mapped to and the number N2 of two-step random access ROs shared to two-step random access configured by the base station, and then determine the first N2 ROs or the last N2 ROs in the N1 four-step random access ROs as the two-step random access ROs. Specifically, the number N2 of two-step random access ROs shared to two-step random access in each SSB configured by the base station may be derived from the number N3 of SSBs (may be equivalent to the number of two-step random access ROs which one SSB is mapped to) that may be mapped to each two-step random access RO configured by the base station, that is, the number N3 of SSBs that may be mapped to each two-step random access RO configured by the base station. When the four-step random access and the two-step random access are configured separately, it may be understood that N3 SSBs may be mapped to one two-step random access RO, and when the four-step random access and the two-step random access share random access resource, it may be understood that the first (or last) 1/N3 of the four-step random access ROs which an SSB is mapped to is shared for the two-step random access.

According to an embodiment of the present disclosure, the UE may determine a valid two-step random access time-frequency resource from the shared two-step random access time-frequency resource.

Referring back to FIG. 2, in step S203, the UE determines a valid PUSCH resource based on the PUSCH resource configuration.

According to an embodiment of the present disclosure, the UE determines the PUSCH resource based on the PUSCH resource configuration, and determines a valid PUSCH resource from the PUSCH resource. According to an embodiment of the present disclosure, the UE determines whether a PUSCH time-frequency resource in the PUSCH resource is valid. If the PUSCH time-frequency resource in the PUSCH resource is valid, the PUSCH resource is considered to be valid.

According to an embodiment of the present disclosure, the UE determines the valid PUSCH resource in which the PUSCH time-frequency resource is valid and the DMRS resource is valid determined from the PUSCH resource configuration.

According to an embodiment of the present disclosure, the UE determines the valid PUSCH resource based on the random access resource configuration and the PUSCH resource configuration. According to an embodiment of the present disclosure, the UE determines the position of the random access time-frequency resource and the offset between the PUSCH time-frequency resource and the random access time-frequency resource based on the random access resource configuration and the PUSCH resource configuration, and then determines the position of the PUSCH time-frequency resource based on the position of the random access time-frequency resource and the offset. The random access time-frequency resource corresponds to the PUSCH time-frequency resource at an offset from the random access time-frequency resource, that is, the random access time-frequency resource corresponds to the PUSCH time-frequency resource.

After determining that the two-step random access is performed, the UE determines the random access resource and the data resource for two-step random access configured by the base station based on above received configuration information, then the UE needs to check the validity of the random access resource and the data resource according to certain rules, that is, determining whether the configured random access resource and data resource are available.

According to an embodiment of the present disclosure, the validity judgment of the random access time-frequency resource for two-step random access may be implemented by one or more of the following rules: if the configured random access time-frequency resource is indicated as an uplink part (uplink symbol and/or uplink time slot) in uplink and downlink configuration information, then it is a valid random access time-frequency resource; if the configured random access time-frequency resource is located after N time units after the last SSB in a time slot, then it is valid random access time-frequency resource; at this time, the configured random access time-frequency resource may not be in the uplink part indicated by the uplink and downlink configuration information; if the configured random access time-frequency resource is located after N time units after the downlink part indicated in the uplink and downlink configuration information, it is valid random access time-frequency resource; at this time, the configured random access time-frequency resource may not be in the uplink part as indicated by the uplink and downlink configuration information; and specifically, the foregoing mapping of the downlink beam to RO means the mapping from the SSB to a valid RO, that is, the validity judgment of RO is performed first, and then the SSB-RO mapping is performed.

For the PUSCH time-frequency resource in the data resource configured for two-step random access, the data resource configured for two-step random access may be directly configured by the base station, or may be derived by the UE through the configured relative relationship. The validity judgment of the PUSCH time-frequency resource may be implemented by one or more of the following rules: if the configured PUSCH time-frequency resource is indicated as an uplink part (uplink symbol and/or uplink time slot) in uplink and downlink configuration information, it is a valid PUSCH time-frequency resource; if the configured PUSCH time-frequency resource is located after N time units after the last SSB in a time slot, it is a valid PUSCH time-frequency resource; at this time, the configured PUSCH time-frequency resource may not be in the uplink part as indicated by the uplink and downlink configuration information; if the configured PUSCH time-frequency resource is located after N time units after the downlink part indicated in the uplink and downlink configuration information, it is a valid PUSCH time-frequency resource; at this time, the configured PUSCH time-frequency resource may not be in the uplink part indicated by the uplink and downlink configuration information; and if the configured PUSCH time-frequency resource does not overlap with the random access time-frequency resource for valid two-step random access and/or the random access time-frequency resource for valid four-step random access, then it is a valid PUSCH time-frequency resource, that is, if there is an overlap, the configured PUSCH time-frequency resource is invalid.

Specifically, according to an embodiment of the present disclosure, when the configured PUSCH time-frequency resource overlaps with another configured PUSCH time-frequency resource, the UE may determine that the overlapping PUSCH time-frequency resources are invalid. According to another embodiment of the present disclosure, when the configured PUSCH time-frequency resource overlaps with another configured PUSCH time-frequency resource, the UE calculates only one valid PUSCH resource for the overlapping PUSCH time-frequency resources. For example, if two PUSCH time-frequency resource units overlap, only one PUSCH time-frequency resource unit is valid, and it is determined which PUSCH time-frequency resource unit is valid according to a certain rule. The certain rule may be at least one of the following: a PUSCH time-frequency resource unit derived from a more advanced (or later) random access time-frequency resource (such as a RACH slot) is valid; then a configured DMRS resource is also determined according to the valid PUSCH time-frequency resource unit; the PUSCH time-frequency resource unit with an more advanced (or later) non-overlapping part is valid; and the configured DMRS resource is also determined according to the valid PUSCH time-frequency resource unit.

According to an embodiment of the present disclosure, the user also needs to perform validity judgment on a preamble resource in the random access resource for two-step random access, which may be implemented by one or more of the following rules: if the random access time-frequency resource where the configured preamble is located is valid, the configured preamble is valid; if the PUSCH time-frequency resource derived from the configured preamble according to a relative position configuration is valid, the configured preamble is valid; that is, if the PUSCH resource derived from the configured preamble is invalid, the preamble is also invalid. The preamble is not used for mapping between a downlink beam and a random access resource, and/or the preamble is not used for the user to select for two-step random access; if the corresponding PUSCH resource cannot be obtained by derivation from the configured preamble according to the relative position configuration, the configured preamble is valid; that is, when the number of configured preambles is X, the PUSCH resource derived from the current RACH time slot is Y, and the mapping ratio is N, N preambles correspond to 1 PUSCH resource; for example, N=1 indicates that one preamble corresponds to one PUSCH resource unit; when X<=Y, all preambles may correspond to PUSCH resources; and when X>Y, there are [X−Y*N] preambles that cannot correspond to PUSCH resources, which may be considered as invalid preambles. Preferably, the current RACH time slot may be current single RACH time slot, or a set of multiple current consecutive RACH time slots, or a set of RACH time slots in a relevant period of the random access resource for a two-step random access. Specifically, when W SSBs are mapped to an RO, the W SSBs evenly share the invalid preambles, that is, the last (or first) [X−Y*N]/W preambles of the preambles corresponding to each SSB are invalid; in this way, it ensures that the number of valid preambles corresponding to each SSB is as same as possible; and preferably, the W SSBs evenly may share the invalid preamble in any of the following approaches:

the last (or first) [X−Y*N]/W preambles in the preambles corresponding to each SSB in the relevant period of the random access resource for a two-step random access are invalid;

the last (or first) [X−Y*N]/W preambles in the preambles in each RO corresponding to each SSB in the relevant period of the random access resource for a two-step random access are invalid; in this way, the UE expects that [X−Y*N]/W is less than (or not greater than) the number of preambles corresponding to a SSB on a RO;

the W may refer to the number of different SSBs that may be mapped on the current RACH time slot. For example, the system is configured with a total of X SSBs, but only W (W<X) SSBs are mapped on the current RACH time slot, then the W SSBs in the whole relevant period of the random access resource for the two-step random access need to share the [X−Y*N]

invalid preambles, and the other X-W SSBs need to reduce [X-Y*N]/W preambles accordingly, in this way, it may continue to ensure that the number of valid preambles corresponding to each SSB is consistent, and to ensure the fairness of the random access;

then the preamble is not used for mapping between a downlink beam and a random access resource, and/or the preamble is not used for the user to select for two-step random access.

According to an embodiment of the present disclosure, it is determined that the random access time-frequency resource is valid, if at least one of the following conditions is satisfied: the random access time-frequency resource is indicated as an uplink resource in uplink and downlink configuration information configured by the base station; an interval between the random access time-frequency resource and the last SSB in a random access channel (RACH) time slot is greater than or equal to a predetermined time interval; and an interval between the random access time-frequency resource and the last time unit of a downlink resource indicated in the uplink and downlink configuration information received from the base station is greater than or equal to a predetermined time interval.

According to an embodiment of the present disclosure, it is determined that the PUSCH time-frequency resource is valid, if at least one of the following conditions is satisfied: the PUSCH time-frequency resource is indicated as an uplink resource in uplink and downlink configuration information configured by the base station; an interval between the PUSCH time-frequency resource and the last SSB in the time slot of the PUSCH time-frequency resource is greater than or equal to a predetermined time interval; an interval between the PUSCH time-frequency resource and the last time unit of the downlink resource indicated in the uplink and downlink configuration information received from the base station is greater than or equal to a predetermined time interval; the PUSCH time-frequency resource does not overlap with the random access time-frequency resource; and the PUSCH time-frequency resource does not overlap with second PUSCH time-frequency resource, where the second PUSCH time-frequency resource is another determined PUSCH time-frequency resource in the time slot of the PUSCH time-frequency resource.

According to an embodiment of the present disclosure, if the PUSCH time-frequency resource overlaps with the second PUSCH time-frequency resource and the random access time-frequency resource corresponding to the PUSCH time-frequency resource is before or after the random access time-frequency resource corresponding to the second PUSCH time-frequency resource, the PUSCH time-frequency resource is valid; or if the PUSCH time-frequency resource partially overlaps with the second PUSCH time-frequency resource and the more advanced (or later) non-overlapping portion belongs to the PUSCH time-frequency resource, the PUSCH time-frequency resource is valid.

According to an embodiment of the present disclosure, it is determined that the random access preamble is valid, if at least one of the following conditions is satisfied: a random access time-frequency resource of the random access preamble is valid; the random access preamble may correspond to PUSCH resource; and the PUSCH time-frequency resource corresponding to the random access preamble is valid.

According to an embodiment of the present disclosure, the user may determine by default that the random access time-frequency resource for the two-step random access and/or the preamble resource for the two-step random access and/or the data resource for the two-step random access configured by the base station are valid; that is, it is guaranteed by the base station that the time-frequency resource may not conflict with each other or conflict with the uplink and downlink configuration. According to an embodiment of the present disclosure, before using a random access resource and a data resource, the validness may be judged first, which can avoid a conflict between the uplink resource (for message transmission for two-step random access) configured by the base station and other configured uplink and downlink resources, thereby achieving valid transmission of the random access resource and the data resource for two-step random access.

According to an embodiment of the present disclosure, after judging the validity of the resources, the UE performs mapping between the obtained valid random access resource for two-step random access and valid data resource for two-step random access within a certain period. Here, the certain period may be at least one of the following:

1. pre-defined period, for example, 10 ms, 20 ms, 40 ms, 80 ms, 160 ms, and etc.;
2. a related period of the random access resource for two-step random access; and the related period of the random access resource for two-step random access may include at least one of the following: a mapping ring of a downlink beam to the random access resource for two-step random access, for example, a mapping ring of SSB to RO; a configuration period of the random access resource for two-step or four-step random access; an association period of a downlink beam to the random access resource for two-step or four-step random access; or an association pattern period of a downlink beam to the random access resource for two-step or four-step random access. Preferably, it may also be a single (valid) random access occasion, or a single (valid) random access time slot, or a set of consecutive (valid) random access occasions, or a set of consecutive (valid) random access time slots. It should be understood that the items listed above are merely exemplary, and the present disclosure is not limited thereto;
3. a related period of the data resource for two-step random access; and the related period of the data resource for two-step random access may include at least one of the following: a mapping ring of a downlink beam to the data resource for two-step random access, for example, a mapping ring of SSB to PUSCH; a configuration period of the data resource for two-step random access; an association period of a downlink beam to the data resource for two-step random access; or an association pattern period of a downlink beam to the data resource for two-step random access. It should be understood that the items listed above are merely exemplary and the present disclosure is not limited thereto; and
4. a large period or a small period of the related period of the random access resource for two-step random access and the related period of the data resources for two-step random access. The related comparison between the related period of the random access resource for two-step random access and the related period of the data resources for two-step random access may be based on at least one of the following: the time length occupied by a single related period (which may include the influence from different subcarrier sizes); the number of time units included in a single related period, for example, including N time slots, M OFDM symbols, etc.; the number of configuration resources included in a single related period; the number of equivalent configuration resources included in a single related period. It should be understood that the items listed above are merely exemplary and the present disclosure is not limited thereto.

Specifically, here, for the number of configuration resources included in a single related period, 1) for the related period of the random access resource for two-step random access, the number of the included configuration resources is the number of random access occasions N_ro for two-step random access included in a related period of the random access resource for two-step random access, and/or the number of preambles N_preambleperro for two-step random access on one random access occasion, and/or the number of random access occasions multiplying the number of preambles for two-step random access on one random access occasion, that is, N_ro*N_preambleperro; the number of configuration resources may be the number of valid resources. For example, 20 random access occasions are configured in a period, and resources determined to be invalid through a predefined validity judgment criterion may not be counted into the number. For example, if 6 ROs conflict with the downlink and become invalid ROs, and the remaining 14 ROs are valid, the number of obtained (valid) configuration resources is 14; 2) for a related period of the data resource for two-step random access, the number of the included configuration resources is the number N_pusch of PUSCH time-frequency resource units for two-step random access included in a related period of the data resource for two-step random access; and/or the number N_dmrsperpusch of DMRS resources for two-step random access on one PUSCH time-frequency resource, and/or the number of PUSCH time-frequency resource units multiplying the number of DMRS resources for two-step random access on one PUSCH time-frequency resource, that is, N_pusch*N_dmrsperpusch, which is the number of PUSCH resource units; the number of configuration resources may be the number of valid resources. For example, 20 PUSCH time-frequency resource units are configured in a period, and invalid resources determined through a predefined validity judgment criterion may not be counted into the number. For example, if 6 PUSCH time-frequency resource units conflict with the downlink and become invalid PUSCH time-frequency resource units, the remaining 14 PUSCH time-frequency resource units are valid, the number of the obtained (valid) configuration resources is 14. It should be understood that the items listed above are merely exemplary and the present disclosure is not limited thereto.

Here, for the number of the equivalent configuration resources included in a single related period, it is determined that whether the configuration resources in a related period of the random access resource for two-step random access may be completely mapped to the configuration resources in a related period of a data resource for two-step random access. If yes, it may be determined that the related period of the data resource for two-step random access is the association period; or it is determined whether the configuration resources in a related period of the data resource for two-step random access may be completely mapped to the configuration resources in a related period of the random access resource for two-step random access. If yes, it may be determined that the related period of the random access resource for two-step random access is the association period. For example, the user equipment may obtain a mapping parameter N between the random access resource for two-step random access and the data resource for two-step random access (may be obtained from the RRC configuration of the user equipment sent by the base station, system message, downlink control information, or preconfigured parameter information). For example, if N=4, it means that 4 preambles for two-step random access are mapped to 1 PUSCH resource unit for two-step random access, and if N=1/4, it means that 1 preamble for two-step random access is mapped to 4 PUSCH resource units for two-step random access. The number of the equivalent configuration resources may be the number of the equivalent configuration resources of the data resource for two-step random access obtained through the mapping parameter N by the number of the configuration resources included in a related period of the random access resource for two-step random access, or the number of the equivalent configuration resources of the random access resource for two-step random access obtained through the mapping parameter N by the number of the configuration resources included in a related period of the data resource for two-step random access. For example, if the number of the configuration resources included in a related period of the random access resource for two-step random access is 20 ROs and the mapping parameter is N=4, the number of the equivalent configuration resources is 20/4=5 PUSCH resource units; if the number of the configuration resources included in a related period of the data resource for two-step random access is 20 PUSCH resource units, which is greater than the number of the equivalent configuration resources included in a related period of the random access resource for two-step random access, it indicates that the number of the configuration resources included in a related period of the data resource for two-step random access may completely map to the random access resources included in a related period of the random access resource for two-step random access, so that it may be determined that a related period of the data resource for two-step random access is the association period; similarly, the number of the equivalent configuration resources may be obtained through the number of the configuration resources of a related period of the data resource for two-step random access and the mapping parameter, and then the number of the equivalent configuration resources is compared with the configuration resources included in a related period of the random access resource for two-step random access, to obtain the association period. Here, the configuration resource may be a valid configuration resource. It should be understood that the items listed above are merely exemplary and the present disclosure is not limited thereto.

According to another embodiment of the present disclosure, based on the valid random access resource (random access occasion and/or random access preamble) and the valid data resource (PUSCH time-frequency resource and/or DMRS resource) obtained within a certain period, and the obtained mapping parameter N (preferably, the mapping parameter may be calculated and derived by the UE in a certain method), the UE can map the valid random access preambles to the corresponding valid data resources according to the obtained mapping parameter. If not all obtained valid random access preambles can be mapped to the obtained valid data resources, in addition that the preambles that cannot be mapped to the valid data resources may be set as invalid in the above process, or only the preambles are sent in message A, the UE may also not expect the base station to notify such a configuration, that is, if not all obtained valid random access preambles can be mapped to the obtained valid data resources, it is an error condition; and the base station should ensure that all obtained valid random access preambles can be mapped to the obtained valid data resource in the configuration of the UE.

According to an embodiment of the present disclosure, after determining valid random access resource and valid PUSCH resource, the UE performs mapping between the valid random access resource and the valid PUSCH resource.

Specifically, according to an embodiment of the present disclosure, the UE may map the preamble in the valid random access resource to valid PUSCH resource unit based on the mapping parameter. According to an embodiment of the present disclosure, the UE may preferentially map the preamble in the random access resource to PUSCH resource corresponding to the random access resource. Specifically, the UE may preferentially map the preamble to PUSCH time slot resource or PUSCH time slot unit corresponding to random access time slot resource and random access time slot unit carrying the preamble. Here, the random access time slot resource corresponds to PUSCH time slot resource that is shifted from starting position of the random access time slot resource by an offset configured by the resource configuration information, that is, based on starting position of the random access time slot resource and the offset, the corresponding PUSCH time slot resource can be deduced.

According to an embodiment of the present disclosure, if not all random access preambles can be mapped to valid PUSCH resource units, random access preambles that are not mapped are discarded or considered as invalid. According to an embodiment of the present disclosure, if not all random access preambles can be mapped to valid PUSCH resource units, random access preambles that are not mapped may be mapped to additional PUSCH resource units corresponding to subsequent RACH time slots. The additional PUSCH resource units corresponding to the subsequent RACH time slots may be PUSCH resource units that are not mapped to the random access preambles in the subsequent RACH time slot in the corresponding PUSCH resource unit, after all the random access preambles in the subsequent RACH time slot have been mapped to the corresponding PUSCH resource unit.

Figure 5:
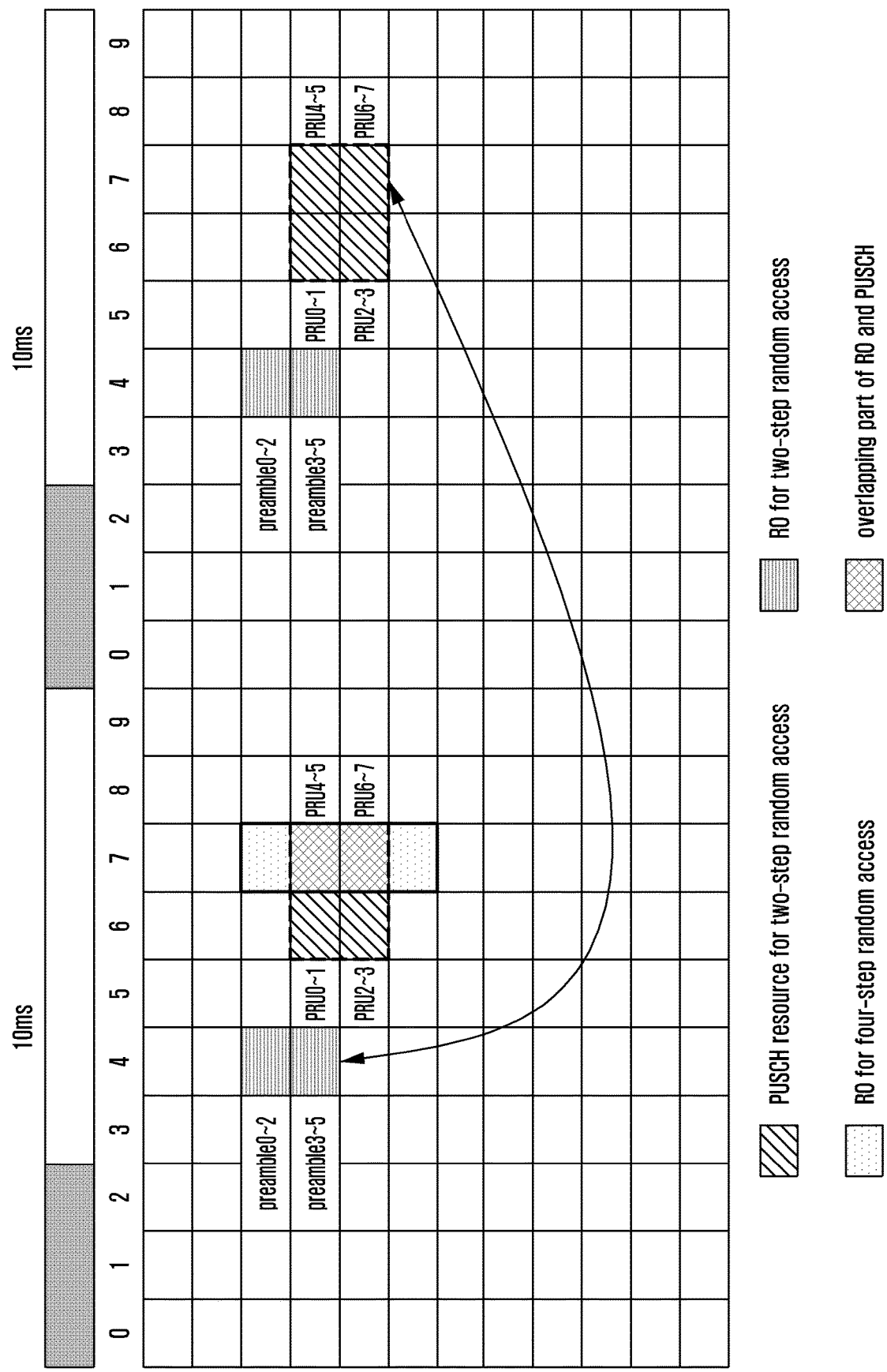
FIG. 5 is a mapping view of a random access resource and a PUSCH resource according to an embodiment of the present disclosure.

According to an embodiment of the present disclosure, the UE transmits a random access signal to the base station through a valid random access resource and a valid PUSCH resource to which the valid random access resource is mapped. Specifically, when the UE performs the mapping, it may be found that for the random access resource in a RACH slot, not all random access resource on the RACH slot may be mapped to the valid PUSCH resource obtained after the validity judgment on one or more PUSCH resources derived according to the relative relationship. For example, as shown in FIG. 5, the random access resource configuration period for two-step random access is 10 ms, there are two ROs on time slot 4 and in the frequency domain, and each RO is configured with 3 two-step random access preambles, that is, there Is a total of 6 preambles configured on a two-step random access configuration period; and the corresponding PUSCH resource is located on two sequential time slots, and the interval between the first slot of the two sequential time slots and the RACH time slot is 1 time slot and the RACH time slot is located before the first slot of the two sequential time slots (if the interval includes the RACH time slot, that is, if the starting point of the RACH time slot is considered as the reference point, the interval is 2 time slots). There are two PUSCH time-frequency resource units (PRUs) in the frequency domain. Each PUSCH time-frequency resource unit is configured with 2 DMRS resources, that is, through the relative relationship, in a two-step random access configuration period, the UE may derive to obtain 8 PUSCH resource units, and the mapping ratio N=1. However, through the validity judgment, in the prior 10 ms, since the PUSCH time-frequency resource in a next time slot overlaps with the valid random access resource for four-step random access, the PUSCH time-frequency resource in the next time slot is determined as an invalid PUSCH resource. Then, in the current random access configuration period, there are 4 valid PUSCH resource units; and not all 6 preambles on the corresponding RACH time slot can be mapped the invalid PUSCH resource.

In this case, according to an embodiment of the present disclosure, the UE may consider the preamble that cannot be mapped to a valid PUSCH resource as invalid according to the validity judgment of the corresponding preamble. In the above example, there are 2 preambles being invalid.

According to another embodiment of the present disclosure, the UE still considers the preamble to be valid, if the preamble is not mapped to a corresponding valid PUSCH resource unit. When the UE selects the preamble for two-step random access, the currently sent message A only includes the preamble.

According to another embodiment of the present disclosure, the UE performs mapping between all valid preambles and valid PUSCH resource units within a certain period of time, that is, it may map the current preambles that are not mapped to valid PUSCH resource units derived by current RACH time slots to the PUSCH resource units derived by the next RACH time slots. Specifically, the PUSCH resource units derived by the next RACH time slots are preferentially mapped to the valid preamble in the next RACH time slots, that is, the additional PUSCH resource units are used for the current preambles that are not mapped to valid PUSCH resource unit derived by the current RACH time slots. In the present example, the certain period is the association pattern period (20 ms) of SSB to the random access resource for two-step random access; then similarly, 8 valid PUSCH resource units in the next 10 ms (that is, in the next random access configuration period) may be obtained; the mapping between the random access resource and the data resource for two-step random access is performed based on the association pattern period (20 ms) of SSB to the random access resource for two-step random access. Here, it is obtained that in a 20 ms association pattern period, the total number of preambles is 12, and the number of valid PUSCH resource units is 12. According to the mapping priority, the 4 preambles in RACH time slot in the first 10 ms are firstly mapped to the valid 4 PUSCH resource units derived from the RACH time slot in the first 10 ms, and the 6 preambles in the RACH time slot in the last 10 ms are firstly mapped to the valid 6 PUSCH resource units derived from this RACH time slot in the last 10 ms, and the remaining 2 preambles in the RACH time slot in the first 10 ms are mapped to the 2 remaining valid PUSCH resource units obtained by the derivation according to the fact that 6 preambles in the RACH time slot in the last 10 ms are firstly mapped to this RACH time slot in the last 10 ms.

According to an embodiment of the present disclosure, when PUSCH resource units derived from the subsequent RACH time slot meet a certain condition, the PUSCH resource units may be used to map to the preambles that are not mapped to the valid PUSCH resource unit derived from the previous RACH time slot, and the certain condition may be at least one of the following: a time interval between the PUSCH resource unit derived from the subsequent RACH time slot and time domain location (RO or RACH time slot, etc.) where the random access preambles that are not mapped to valid PUSCH resource unit derived from the previous RACH time slot is less than or equal to a threshold value; or the PUSCH resource unit derived from the subsequent RACH time slot and the random access time-frequency resource of the preambles that are not mapped to valid PUSCH resource units derived from the previous RACH time slot are in the same specified period, for example, belonging to the same SSB-RO association pattern period.

According to another embodiment of the present disclosure, based on the valid random access resource (random access occasion and/or random access preamble) and the valid data resource (PUSCH time-frequency resource and/or DMRS resource) obtained within a certain period, and the obtained mapping parameter N (preferably, the mapping parameter may be calculated and derived by the UE in a certain method), the UE can map the valid random access preamble to the corresponding valid data resource according to the obtained mapping parameter. If all the random access preambles in the valid random access resource are mapped and there is valid data resource remaining, the remaining valid data resource is no longer used, i.e., no preamble is mapped to the remaining valid data resource. For example, the certain period is 3 consecutive random access time slots, a total of 36 valid random access preambles are obtained, and the obtained mapping parameter N=4, that is, 4 preambles are mapped to 1 PUSCH resource unit, the number of obtained valid PUSCH resource units (that is, multiplying the number of valid PUSCH time-frequency resource units by the number of DMRS resources on each PUSCH time-frequency resource unit) is 12; and 36 preambles need to be mapped to a total of 9 PUSCH resource units, that is, there are 3 remaining PUSCH resource units, then these 3 PUSCH resource units are not used, i.e., no preamble may be mapped to these 3 PUSCH resource units.

According to an embodiment of the present disclosure, after the validity judgment and mapping operation, the UE can find an available PUSCH resource (PUSCH time-frequency resource and DMRS resource) through a determined (selected) two-step random access RO, a preamble, and a mapping result. If N>1 PUSCH resources are found, the UE selects a PUSCH resource from the PUSCH resources equiprobably for corresponding PUSCH transmission. According to an embodiment of the present disclosure, the base station side may parse only the PUSCH resource to which the detected preamble is mapped, thereby saving resources and improving efficiency.

After message A is sent by the UE, the UE searches for possible random access feedback on a configured or preset downlink control channel resource, and the UE performs subsequent operations according to the type of the received downlink feedback and the content in the downlink feedback.

Referring back to FIG. 2, in step S204, a random access signal is sent to the base station through the valid random access resource and the valid PUSCH resource.

According to an embodiment of the present disclosure, after the validity judgment operations in steps S202 and S203 described above, the UE may determine a valid random access resource and a valid PUSCH resource for random access. The UE may use the valid random access resource and the valid PUSCH resource to send a random access signal to the base station.

According to an embodiment of the present disclosure, the mapping between the valid random access resource and the valid PUSCH resource may be performed after steps S202 and S203. The UE may determine the valid random access resource for random access, and obtain the mapped valid PUSCH resource according to a mapping table. The UE may send a random access signal to the base station by using the valid random access resource and the valid PUSCH resource to which the valid random access resource is mapped.

Figure 6:
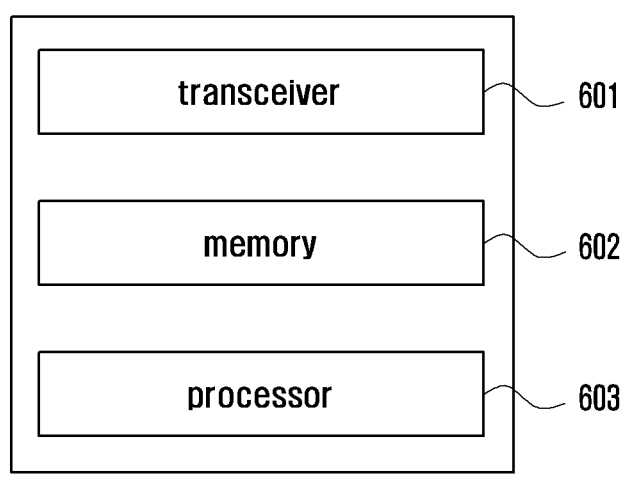
FIG. 6 shows a block diagram of a user equipment according to an embodiment of the present disclosure.

FIG. 6 shows a block diagram of a user equipment according to an embodiment of the present disclosure.

The present embodiment also provides a user equipment 600 for signal transmission. The user equipment includes a transceiver 601, a memory 602, and a processor 603. The memory stores a computer-executable instruction thereon, the instruction, when executed by the processor, implements at least one method corresponding to the foregoing various embodiments of the present disclosure.

According to an embodiment of the present disclosure, the memory 602 may store a computer-executable instruction, the instruction, when executed, cause the processor 603 to: receive random access resource configuration and PUSCH resource configuration for random access of a terminal from a base station by the transceiver 601; determine a valid random access resource based on the random access resource configuration; determine a valid PUSCH resource based on the PUSCH resource configuration; and transmit, based on the valid random access resource and the valid PUSCH resource, a random access request signal to the base station via the transceiver 601.

According to an embodiment of the present disclosure, the memory 602 stores a computer-executable instruction, the instruction, when executed, cause the processor 603 to: determine the valid PUSCH resource based on the random access resource configuration and the PUSCH resource configuration.

According to an embodiment of the present disclosure, the memory 602 stores a computer-executable instruction, the instruction, when executed, cause the processor 603 to: upon determining the valid PUSCH resource based on the PUSCH resource configuration, perform mapping between the valid random access resource and the valid PUSCH resource.

According to an embodiment of the present disclosure, the memory 602 stores a computer-executable instruction, the instruction, when executed, cause the processor 603 to: transmit the random access signal to the base station based on the valid random access resource and the valid PUSCH resource to which the valid random access resource is mapped.

According to an embodiment of the present disclosure, the memory 602 stores a computer-executable instruction, the instruction, when executed, cause the processor 603 to: determine a two-step random access resource for two-step random access based on the random access resource configuration; determine two-step random access resources in which random access time-frequency resources are valid from the determined two-step random access resources for two-step random access; and/or determine a two-step random access resource in which a random access preamble is valid from the determined two-step random access resource for two-step random access; and determine a two-step random access resource in which the random access time-frequency resource and the random access preamble are both valid as the valid random access resource, or determine a valid two-step random access time-frequency resource and a random access preamble determined from the two-step random access resource as the valid random access resource.

According to an embodiment of the present disclosure, the memory 602 stores a computer-executable instruction, the instruction, when executed, cause the processor 603 to: determine a number N1 of random access transmission occasions (ROs) for a four-step random access to which each synchronization signal block (SSB) is mapped; determine, for each SSB, a number N2 of ROs shared for two-step random access and configured by the base station; and determine the first N2 ROs or the last N2 ROs of the N1 ROs for four-step random access ROs as the ROs for the two-step random access.

According to an embodiment of the present disclosure, the memory 602 stores a computer-executable instruction, the instruction, when executed, cause the processor 603 to: determine a valid PUSCH time-frequency resource and a DMRS resource determined from the PUSCH resource configuration as the valid PUSCH resource.

According to an embodiment of the present disclosure, the memory 602 stores a computer-executable instruction, the instruction, when executed, cause the processor 603 to perform the following operation: the random access time-frequency resource is determined to be valid, if at least one of the following conditions is satisfied: uplink and downlink configuration information configured by the base station indicates that the random access time-frequency resource is in an uplink resource; an interval between the random access time-frequency resource and the last SSB in the time slot of the corresponding random access channel RACH is greater than or equal to a predetermined time interval; and an interval between the random access time-frequency resource and the last time unit of the downlink resource indicated in the uplink and downlink configuration information received from the base station is greater than or equal to a predetermined time interval.

According to an embodiment of the present disclosure, the memory 602 stores a computer-executable instruction, the instruction, when executed, cause the processor 603 to perform the following operation: the PUSCH time-frequency resource is determined to be valid, if at least one of the following conditions is satisfied: uplink and downlink configuration information configured by the base station indicates that the PUSCH time-frequency resource is in an uplink resource; an interval between the PUSCH time-frequency resource and the last SSB in the time slot of the PUSCH time-frequency resource is greater than or equal to a predetermined time interval; an interval between the PUSCH time-frequency resource and the last time unit of the downlink resource indicated in the uplink and downlink configuration information received from the base station is greater than or equal to a predetermined time interval; the PUSCH time-frequency resource does not overlap with the random access time-frequency resource; and the PUSCH time-frequency resource does not overlap with a second PUSCH time-frequency resource, where the second PUSCH time-frequency resource is another determined PUSCH time-frequency resource in the time slot of the PUSCH time-frequency resource.

According to an embodiment of the present disclosure, the memory 602 stores a computer-executable instruction, the instruction, when executed, cause the processor 603 to perform the following operations: if the PUSCH time-frequency resource overlaps with a second PUSCH time-frequency resource and the random access time-frequency resource corresponding to the PUSCH time-frequency resource is positioned before or after the random access time-frequency resource corresponding to the second PUSCH time-frequency resource, the PUSCH time-frequency resource is determined to be valid; or if the PUSCH time-frequency resource partially overlaps with the second PUSCH time-frequency resource and the PUSCH time-frequency resource includes a non-overlapping portion which is positioned before or after the overlapping portion, the PUSCH time-frequency resource is determined to be valid.

According to an embodiment of the present disclosure, the memory 602 stores a computer-executable instruction, the instruction, when executed, cause the processor 603 to perform the following operation: the random access preamble is determined to be valid, if at least one of the following conditions is satisfied: a random access time-frequency resource of the random access preamble is valid; the random access preamble may correspond to a PUSCH resource; and the PUSCH time-frequency resource corresponding to the random access preamble is valid.

According to an embodiment of the present disclosure, the memory 602 stores a computer-executable instruction, the instruction, when executed, cause the processor 603 to perform the following operations: if not all valid random access resources can be mapped to the corresponding valid PUSCH resources, mapping an unmapped valid random access resource to a valid PUSCH resource corresponding to a subsequent valid random access resource; and/or re-determining an unmapped valid random access resource to be invalid.

Figure 7:
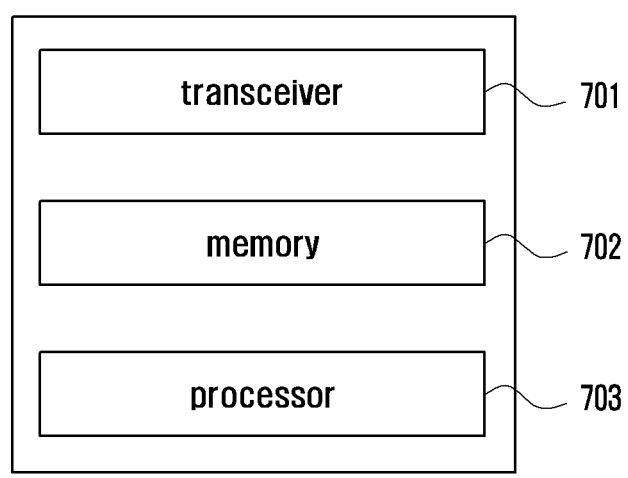
FIG. 7 shows a block diagram of a network device according to an embodiment of the present disclosure.

FIG. 7 shows a block diagram of a network device according to an embodiment of the present disclosure.

The present embodiment also provides a base station equipment 700 for signal transmission/reception. The base station equipment includes a transceiver 701, a memory 702, and a processor 703. The memory stores a computer-executable instruction thereon, the instruction, when executed by the processor, implements at least one method corresponding to the foregoing various embodiments of the present disclosure.

According to an embodiment of the present disclosure, the transceiver 701 may transmit and/or receive information to and from the user equipment. According to an embodiment of the present disclosure, the transceiver 701 may transmit resource configuration information for random access to the user equipment, and the configuration information includes random access resource configuration information and PUSCH resource configuration information. The random access resource configuration information is used to indicate a random access resource (random access time slot resource and preamble). The PUSCH resource configuration information is used to indicate a PUSCH resource (PUSCH time slot resource and DMRS resource).

According to an embodiment of the present disclosure, the memory 702 may store a computer-executable instruction, the instruction, when executed, cause the processor 703 to: transmit random access resource configuration and physical uplink shared channel (PUSCH) resource configuration for random access to the user equipment; determine a valid random access resource based on the random access resource configuration; determine a valid PUSCH resource based on the PUSCH resource configuration; and detect, on the valid random access resource and the valid PUSCH resource, a random access signal of the user equipment.

According to an embodiment of the present disclosure, the memory 702 may store a computer-executable instruction, the instruction, when executed, cause the processor 703 to: perform the same operations as the user equipment 600 described above.

The present embodiment also provides a computer readable medium, storing a computer-executable instruction thereon, the instruction, when executed, implements the method according to any one of the embodiments of the present disclosure.

Specifically, for example, when the instruction is executed, the following steps are performed: receiving random access resource configuration and PUSCH resource configuration for random access from a base station; determining a valid random access resource based on the random access resource configuration; determining a valid PUSCH resource based on the PUSCH resource configuration; and transmitting, based on the valid random access resource and the valid PUSCH resource, a random access request signal to the base station.

According to an embodiment of the present disclosure, when the instruction is executed, the same method as that of the user equipment described above is performed, and detailed description thereof will be omitted.

"User equipment" or "UE" herein may refer to any terminal with radio communication capabilities, including but not limited to mobile phones, cellular phones, smart telephones or personal digital assistants (PDAs), portable computers, image capturing devices such as digital cameras, gaming devices, music storage and playback devices, and any portable units or terminals with radio communication capabilities, or Internet facilities that allow radio Internet access and browsing.

The term "base station" (BS) or "network equipment" used herein may refer to an eNB, an eNodeB, a NodeB, or a base transceiver station (BTS) or gNB, etc. according to the technology and terminology used.

The "memory" herein may be of any type suitable for the technical environment herein and may be implemented using any suitable data storage technology, including, but not limited to, semiconductor-based storage means, magnetic storage means and systems, optical storage means and systems, fixed memories and removable memories.

The processor herein may be of any type suitable for the technical environment herein, including, but not limited to, one or more of the following: general-purpose computers, special-purpose computers, microprocessors, digital signal processor DSPs, and multi-core processor architecture-based processors.

The above are only preferred embodiments of the present disclosure, and are not intended to limit the present disclosure. Any modification, equivalent replacement, or improvement made within the spirit and principle of the present disclosure shall be included in the scope of protection of the present disclosure.

As may be understood by those skilled in the art, the present disclosure includes devices related to performing one or more of the operations described in the present disclosure. These devices may be specially designed and manufactured for the required purpose, or may include known devices in general-purpose computers. These devices have computer programs stored therein that are selectively activated or reconstructed. Such a computer program may be stored in readable medium of a device (e.g., a computer) or in any type of medium suitable for storing electronic instructions and coupled to a bus, respectively, including, but not limited to, any types of disks (including floppy disks, hard disks, optical discs, CD-ROMs, and magneto-optical discs), ROM (Read-Only Memory), RAM (Random Access Memory), EPROM (Erasable Programmable Read-Only Memory), EEPROM (Electrically Erasable Programmable Read-Only Memory), flash memory, magnetic card or optical card. That is, a readable medium includes any medium that stores or transfers information in a readable form by a device (e.g., a computer).

Those skilled in the art may understand that computer program instructions may be used to implement each block in these structural diagrams and/or block diagrams and/or flow diagrams and a combination of the blocks in these structural diagrams and/or block diagrams and/or flow diagrams. Those skilled in the art may understand that these computer program instructions may be provided to a processor of a general-purpose computer, a professional computer, or other programmable data processing methods, so that the solution specified in the block or blocks of the structural diagrams and/or block diagrams and/or flow diagrams disclosed in the present disclosure is executed by a processor of a computer or other programmable data processing method.

Those skilled in the art may understand that the various operations, methods, and steps, measures, and solutions in the process that have been discussed in the present disclosure may be alternated, modified, combined, or deleted. Further, the various operations, methods, and other steps, measures, and solutions in the process that have been discussed in the present disclosure may also be alternated, modified, rearranged, decomposed, combined, or deleted. Further, various operations, methods, and steps, measures, and solutions in the process in the prior art disclosed in the present disclosure may also be alternated, modified, rearranged, decomposed, combined, or deleted.

The above description is only part of the embodiments of the present disclosure. It should be noted that, for those of ordinary skill in the art, without departing from the principles of the present disclosure, several improvements and retouches may be made, which should be regarded as within the protection scope of the present disclosure.

What is claimed is:

1. A method for random access (RA) performed by a terminal in a communication system, the method comprising:
    receiving, from a base station, a first random access channel (RACH) configuration for 4-step RA, a second RACH configuration for 2-step RA, and a physical uplink shared channel (PUSCH) configuration;
    in case that a type of the RA is the 2-step RA, identifying an RA occasion for the 2-step RA;
    identifying a valid PUSCH resource based on the PUSCH configuration, wherein the valid PUSCH resource is a PUSCH resource not overlapping with the RA occasion for the 2-step RA; and
    in case that a random access preamble in the RA occasion for the 2-step RA is not mapped to the valid PUSCH resource, transmitting, to the base station, the random access preamble in the RA occasion for the 2-step RA.

2. The method of claim 1, further comprising:
    in case that the random access preamble in the RA occasion for the 2-step RA is mapped to the valid PUSCH resource, transmitting, to the base station, the random access preamble in the RA occasion for the 2-step RA and a PUSCH in the valid PUSCH resource.

3. The method of claim 1,
    wherein, in case that RA occasions for the 4-step RA are shared with the 2-step RA and an index indicating a subset of the RA occasions for the 4-step RA is configured, the RA occasion for the 2-step RA is associated with the subset of the RA occasions for the 4-step RA, and wherein, in case that the RA occasions for the 4-step RA are shared with the 2-step RA and the index is not configured, the RA occasion for the 2-step RA is associated with all of the RA occasions for the 4-step RA.

4. The method of claim 1,
wherein the type of the RA is the 2-step RA in case that a reference signal received power (RSRP) measured by the terminal is higher than a threshold configured by the base station,
wherein the first RACH configuration for the 4-step RA includes information on RA occasions for the 4-step RA, and
wherein the information on the RA occasions for the 4-step RA includes at least one of a physical RACH (PRACH) configuration index and information on frequency resources for the 4-step RA.

5. The method of claim 1,
wherein the valid PUSCH resource is located after N symbols after a last synchronization signal block (SSB).

6. A method for random access (RA) performed by a base station in a communication system, the method comprising:
transmitting, to a terminal, a first random access channel (RACH) configuration for 4-step RA, a second RACH configuration for 2-step RA, and a physical uplink shared channel (PUSCH) configuration; and
in case that a type of the RA is the 2-step RA, receiving, from the terminal, a random access preamble in an RA occasion for the 2-step RA,
wherein, in case that the random access preamble in the RA occasion for the 2-step RA is not mapped to a valid PUSCH resource, the random access preamble is received, and
wherein the valid PUSCH resource is a PUSCH resource not overlapping with the RA occasion for the 2-step RA.

7. The method of claim 6, wherein, in case that the random access preamble in the RA occasion for the 2-step RA is mapped to the valid PUSCH resource, the random access preamble and the PUSCH are received.

8. The method of claim 6,
wherein, in case that RA occasions for the 4-step RA are shared with the 2-step RA and an index indicating a subset of the RA occasions for the 4-step RA is configured, the RA occasion for the 2-step RA is associated with the subset of the RA occasions for the 4-step RA, and
wherein, in case that the RA occasions for the 4-step RA are shared with the 2-step RA and the index is not configured, the RA occasion for the 2-step RA is associated with all of the RA occasions for the 4-step RA.

9. The method of claim 6,
wherein the type of the RA is the 2-step RA in case that a reference signal received power (RSRP) measured by the terminal is higher than a threshold configured by the base station,
wherein the first RACH configuration for the 4-step RA includes information on RA occasions for the 4-step RA, and
wherein the information on the RA occasions for the 4-step RA includes at least one of a physical RACH (PRACH) configuration index and information on frequency resources for the 4-step RA.

10. The method of claim 6,
wherein the valid PUSCH resource is located after N symbols after a last synchronization signal block (SSB).

11. A terminal for random access (RA) in a communication system, the terminal comprising:
a transceiver; and
a controller coupled with the transceiver and configured to:
receive, from a base station, a first random access channel (RACH) configuration for 4-step RA, a second RACH configuration for 2-step RA, and a physical uplink shared channel (PUSCH) configuration,
in case that a type of the RA is the 2-step RA, identify an RA occasion for the 2-step RA,
identify a valid PUSCH resource based on the PUSCH configuration, wherein the valid PUSCH resource is a PUSCH resource not overlapping with the RA occasion for the 2-step RA, and
in case that a random access preamble in the RA occasion for the 2-step RA is not mapped to the valid PUSCH resource, transmit, to the base station, the random access preamble in the RA occasion for the 2-step RA.

12. The terminal of claim 11, wherein the controller is configured to:
in case that the random access preamble in the RA occasion for the 2-step RA is mapped to the valid PUSCH resource, transmit, to the base station, the random access preamble in the RA occasion for the 2-step RA and a PUSCH in the valid PUSCH resource.

13. The terminal of claim 11,
wherein, in case that RA occasions for the 4-step RA are shared with the 2-step RA and an index indicating a subset of the RA occasions for the 4-step RA is configured, the RA occasion for the 2-step RA is associated with the subset of the RA occasions for the 4-step RA, and
wherein, in case that the RA occasions for the 4-step RA are shared with the 2-step RA and the index is not configured, the RA occasion for the 2-step RA is associated with all of the RA occasions for the 4-step RA.

14. The terminal of claim 11,
wherein the type of the RA is the 2-step RA in case that a reference signal received power (RSRP) measured by the terminal is higher than a threshold configured by the base station,
wherein the first RACH configuration for the 4-step RA includes information on RA occasions for the 4-step RA, and
wherein the information on the RA occasions for the 4-step RA includes at least one of a physical RACH (PRACH) configuration index and information on frequency resources for the 4-step RA.

15. The terminal of claim 11,
wherein the valid PUSCH resource is located after N symbols after a last synchronization signal block (SSB).

16. A base station for random access (RA) in a communication system, the base station comprising:
a transceiver; and
a controller coupled with the transceiver and configured to:
transmit, to a terminal, a first random access channel (RACH) configuration for 4-step RA, a second RACH configuration for 2-step RA, and a physical uplink shared channel (PUSCH) configuration, and in case that a type of the RA is the 2-step RA, receive, from the terminal, a random access preamble in an RA occasion for the 2-step RA, wherein, in case that the random access preamble in the RA occasion for the 2-step RA is not mapped to a valid PUSCH resource, the random access preamble is received, and wherein the valid PUSCH resource is a PUSCH resource not overlapping with the RA occasion for the 2-step RA.

17. The base station of claim 16, wherein, in case that the random access preamble in the RA occasion for the 2-step RA is mapped to the valid PUSCH resource, the random access preamble and the PUSCH are received.

18. The base station of claim 16, wherein, in case that RA occasions for the 4-step RA are shared with the 2-step RA and an index indicating a subset of the RA occasions for the 4-step RA is configured, the RA occasion for the 2-step RA is associated with the subset of the RA occasions for the 4-step RA, and wherein, in case that the RA occasions for the 4-step RA are shared with the 2-step RA and the index is not configured, the RA occasion for the 2-step RA is associated with all of the RA occasions for the 4-step RA.

19. The base station of claim 16, wherein the type of the RA is the 2-step RA in case that a reference signal received power (RSRP) measured by the terminal is higher than a threshold configured by the base station, wherein the first RACH configuration for the 4-step RA includes information on RA occasions for the 4-step RA, and wherein the information on the RA occasions for the 4-step RA includes at least one of a physical RACH (PRACH) configuration index and information on frequency resources for the 4-step RA.

20. The base station of claim 16, wherein the valid PUSCH resource is located after N symbols after a last synchronization signal block (SSB).

* * * * *